United States Patent
Yang et al.

(10) Patent No.: US 12,544,006 B2
(45) Date of Patent: Feb. 10, 2026

(54) SYSTEM AND METHOD FOR SIMULTANEOUS STIMULATION AND RECORDING USING SYSTEM-ON-CHIP (SOC) ARCHITECTURE

(71) Applicant: REGENTS OF THE UNIVERSITY OF MINNESOTA, Minneapolis, MN (US)

(72) Inventors: Zhi Yang, Minneapolis, MN (US); Jian Xu, Minneapolis, MN (US); Anh Tuan Nguyen, Minneapolis, MN (US); Tong Wu, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 532 days.

(21) Appl. No.: 15/876,030

(22) Filed: Jan. 19, 2018

(65) Prior Publication Data

US 2018/0199841 A1    Jul. 19, 2018

Related U.S. Application Data

(60) Provisional application No. 62/448,286, filed on Jan. 19, 2017.

(51) Int. Cl.
*A61B 5/00* (2006.01)
*A61B 5/24* (2021.01)

(52) U.S. Cl.
CPC .............. *A61B 5/4836* (2013.01); *A61B 5/24* (2021.01); *A61B 5/4064* (2013.01); *A61B 5/685* (2013.01);

(Continued)

(58) Field of Classification Search
CPC ............ A61B 5/04001; A61B 5/04004; A61B 5/04012; A61B 5/0428; A61B 5/686; A61B 5/6861; A61B 5/72
See application file for complete search history.

(56) References Cited

U.S. PATENT DOCUMENTS

| 8,937,509 B2* | 1/2015 | Xu ..................... A61B 5/04004 330/124 R |
| 9,867,978 B1* | 1/2018 | Rapoport ............. A61N 1/0534 |

(Continued)

OTHER PUBLICATIONS

Zhou, David et al. (2005). Microsensors and microbiosensors for retinal implants. Frontiers in bioscience : a journal and virtual library. 10. 166-79. 10.2741/1518. (Year: 2005).*

(Continued)

*Primary Examiner* — Niketa Patel
*Assistant Examiner* — Adreanne A. Arnold
(74) *Attorney, Agent, or Firm* — QUARLES & BRADY LLP

(57) ABSTRACT

An implantable neuromodulation system is provided comprising at least one stimulation microelectrode, at least one microelectrode, and a frequency-shaping amplifier (FSA). The at least one stimulation microelectrode is configured to deliver a desired electrical stimulation to a neuronal population. The at least one recording microelectrode is configured to receive neural signals from the neuronal population. The FSA is coupled to the at least one recording microelectrode. The FSA is configured to allow for simultaneous electrical recording and electrical stimulation of the neuronal population.

17 Claims, 31 Drawing Sheets

(52) U.S. Cl.
CPC ............ *A61B 5/686* (2013.01); *A61B 5/7203* (2013.01); *A61B 5/7217* (2013.01); *A61B 5/7225* (2013.01); *A61B 5/4041* (2013.01); *A61B 2505/09* (2013.01); *A61B 2562/028* (2013.01); *A61B 2562/043* (2013.01); *A61B 2562/046* (2013.01); *A61B 2562/166* (2013.01)

(56) References Cited

U.S. PATENT DOCUMENTS

| | | | |
|---|---|---|---|
| 2014/0025715 A1* | 1/2014 | Yang ...................... | G06N 3/063 708/131 |
| 2015/0231397 A1* | 8/2015 | Nudo, Jr. ................ | A61B 5/24 607/62 |
| 2017/0108926 A1* | 4/2017 | Moon ..................... | G06F 3/016 |

OTHER PUBLICATIONS

J. Xu, T. Wu and Z. Yang, "A power efficient frequency shaping neural recorder with automatic bandwidth adjustment," 2014 IEEE Asian Solid-State Circuits Conference (A-SSCC), 2014, pp. 197-200, doi: 10.1109/ASSCC.2014.7008894. (Year: 2014).*

A. Bagheri, S. Gabran, M. T. Salam, J. L. Perez Velazquez, R. R. Mansour, M. Salama, and R. Genov, "Massively-parallel neuromonitoring and neurostimulation rodent headset with nanotextured flexible microelectrodes," Biomedical Circuits and Systems, IEEE Transactions on, vol. 7, No. 5, pp. 601-609, 2013.

E. A. Brown, J. D. Ross, R. A. Blum, Y. Nam, B. C. Wheeler, and S. P. DeWeerth, "Stimulus-artifact elimination in a multi-electrode system," Biomedical Circuits and Systems, IEEE Transactions on, vol. 2, No. 1, pp. 10-21, 2008.

J. Dai, D. I. Brooks, and D. L. Sheinberg, "Optogenetic and electrical microstimulation systematically bias visuospatial choice in primates," Current Biology, vol. 24, No. 1, pp. 63-69, 2014.

M. H. Histed, V. Bonin, and R. C. Reid, "Direct activation of sparse, distributed populations of cortical neurons by electrical microstimulation," Neuron, vol. 63, No. 4, pp. 508-522, 2009.

P. Hottowy, A. Skoczen, D. Gunning, and e. a. Kachiguine, Sergei, "Properties and application of a multichannel integrated circuit for low-artifact, patterned electrical stimulation of neural tissue," Journal of Neuroengineering, vol. 9, No. 6, 2012.

Y. Nam, E. A. Brown, J. D. Ross, R. A. Blum, B. C. Wheeler, and S. P. DeWeerth, "A retrofitted neural recording system with a novel stimulation ic to monitor early neural responses from a stimulating electrode," Journal of neuroscience methods, vol. 178, No. 1, pp. 99-102, 2009.

A. T. Nguyen, J. Xu, and Z. Yang, "A 14-bit 0.17mm2 SAR ADC in 0.13 μm CMOS for high precision nerve recording," IEEE Custom Integrated Circuits Conference, pp. 1-4, 2015.

S. Ohayon, P. Grimaldi, N. Schweers, and D. Y. Tsao, "Saccade modulation by optical and electrical stimulation in the macaque frontal eye field," The Journal of Neuroscience, vol. 33, No. 42, pp. 16 684-16 697, 2013.

L. Rossi, G. Foffani, S. Marceglia, F. Bracchi, S. Barbieri, and A. Priori, "An electronic device for artefact suppression in human local field potential recordings during deep brain stimulation," Journal of neural engineering, vol. 4, No. 2, p. 96, 2007.

F. Shahrokhi, K. Abdelhalim, D. Serletis, P. L. Carlen, and R. Genov, "The 128-channel fully differential digital integrated neural recording and stimulation interface," Biomedical Circuits and Systems, IEEE Transactions on, vol. 4, No. 3, pp. 149-161, 2010.

W.-K. Tam, R. So, C. Guan, and Z. Yang, "EC-PC spike detection for high performance brain-computer interface," in Engineering in Medicine and Biology Society (EMBC), 2015 37th Annual International Conference of the IEEE. IEEE, 2015, pp. 5142-5145.

T. Wu, J. Xu, Y. Lian, A. Khalili, A. Rastegarnia, C. Guan, and Z. Yang, "A 16-channel nonparametric spike detection ASIC based on EC-PC decomposition," Biomedical Circuits and Systems, IEEE Transactions on, vol. PP, No. 99, pp. 1-1, 2015.

J. Xu and Z. Yang, "A 50 μW/Ch Artifacts-Insensitive Neural Recorder Using Frequency-Shaping Technique," IEEE Custom Integrated Circuits Conference, pp. 1-4, 2013.

J. Xu, T. Wu, and Z. Yang, "A new system architecture for future long-term high-density neural recording," IEEE Transactions on Circuits and Systems II: Express Briefs, vol. 60, No. 7, pp. 402-406, Jul. 2013.

A. Yazdan-Shahmorad, C. Diaz-Botia, T. L. Hanson, V. Kharazia, P. Ledochowitsch, M. M. Maharbiz, and P. N. Sabes, "A large-scale interface for optogenetic stimulation and recording in nonhuman primates," Neuron, vol. 89, No. 5, pp. 927-939, 2016.

* cited by examiner

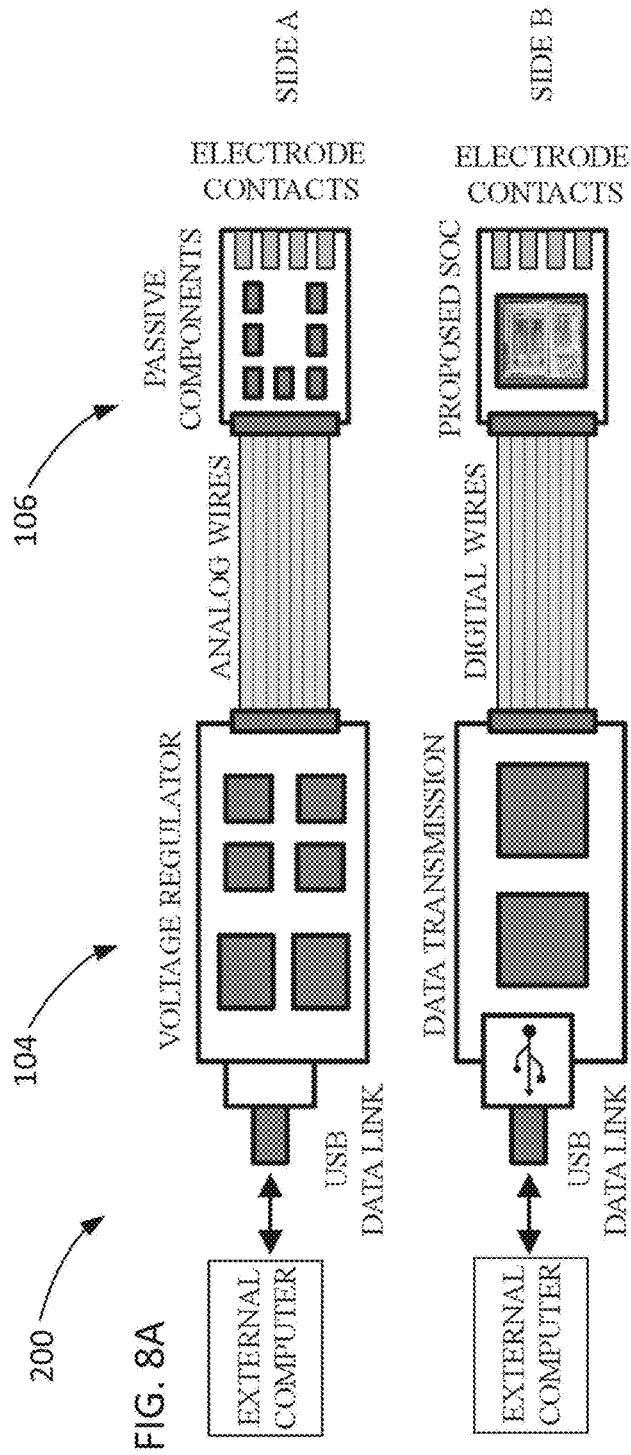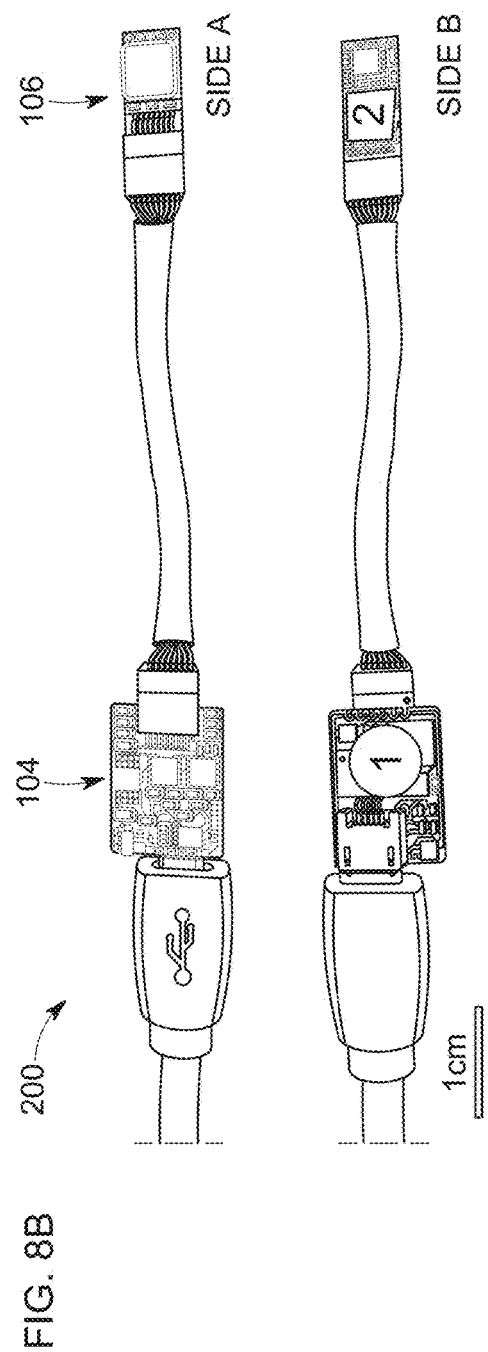
FIG. 8A
FIG. 8B

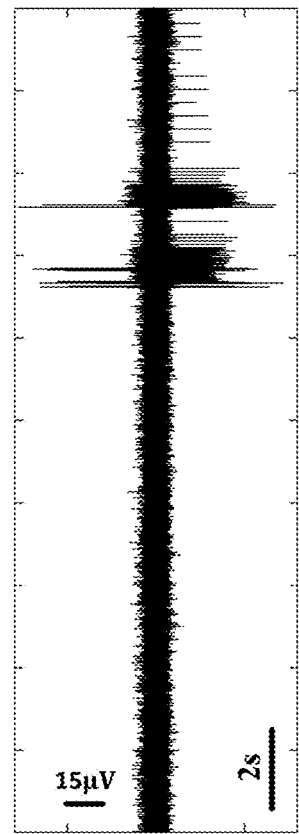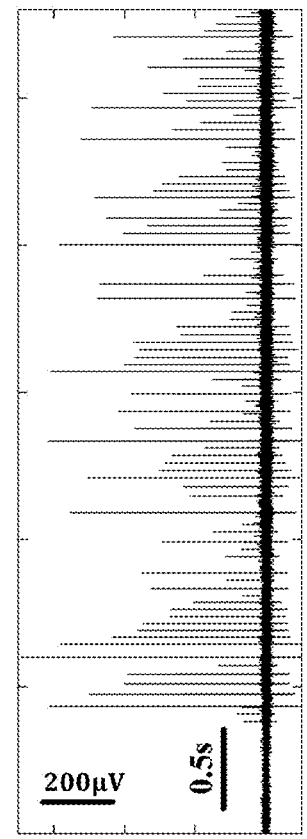
FIG. 14A
FIG. 14B

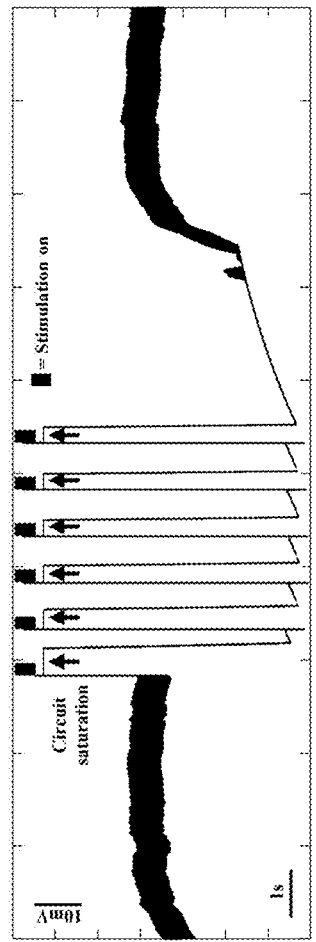
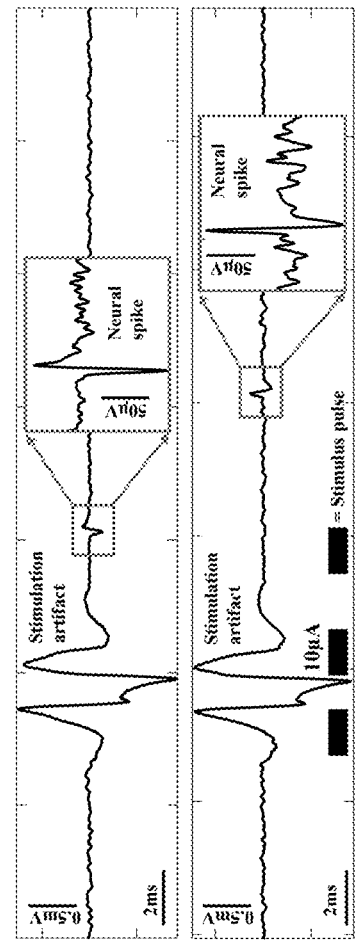
FIG. 17A
FIG. 17B

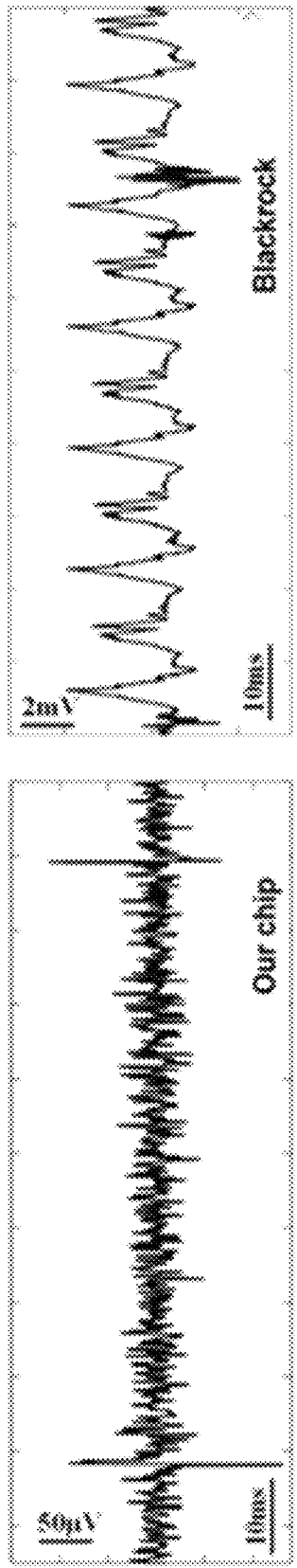
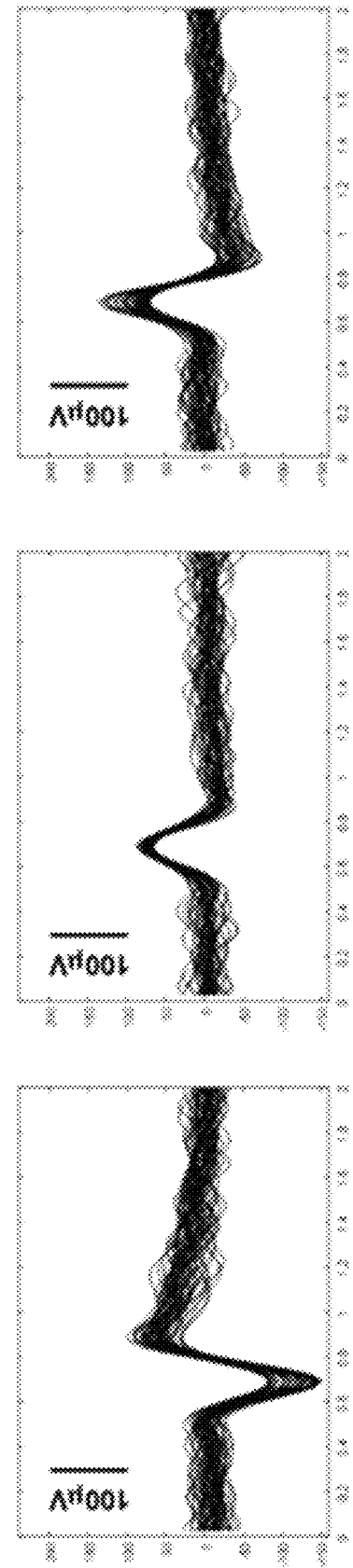
FIGURE 20A
FIGURE 20B
FIGURE 20C
FIGURE 20D
FIGURE 20E

SYSTEM AND METHOD FOR SIMULTANEOUS STIMULATION AND RECORDING USING SYSTEM-ON-CHIP (SOC) ARCHITECTURE

CROSS-REFERENCE TO RELATED APPLICATIONS

This application is based on, claims priority to, and incorporates herein by reference in its entirety for all purposes, U.S. Provisional Application Ser. No. 62/448,286, filed Jan. 19, 2017, and entitled, "SYSTEM AND METHOD FOR SIMULTANEOUS STIMULATION AND RECORDING USING SYSTEM-ON-CHIP (SOC) ARCHITECTURE."

FIELD OF THE DISCLOSURE

This document generally concerns systems and methods for closed-loop neuromodulation, and more specifically, miniaturized systems-on-chip (SoCs) that allow recording with simultaneous electrical microstimulation well-suited for research and clinical applications.

BACKGROUND

Electrical stimulation has been used for probing neural circuitry and identifying networks of neurons for many years. Despite its extensive use, the mechanism of electrical stimulation on the nervous system remains poorly understood. Investigating and understanding the behavior of neural populations under electrical stimulation requires monitoring the neural activity at the same time as electrical stimulation. However, due to stimulation artifacts and multiple technical challenges on circuits and electrodes, simultaneous recording and microstimulation has not been demonstrated.

Additionally, a substantial amount of effort has been expended in attempting to remove stimulation artifacts. Another approach is temporally shutting down the recorder and discharging the electrode. In this approach, emphasis has traditionally been placed on charge balancing and how fast the charge can be removed. However, a fast recovery from stimulation artifacts does not provide the recorder with the ability to immediately record spikes. Another attempted approach has been to use very small stimulation current (i.e. 430 nA) and low impedance electrodes so that the artifacts do not go beyond the recorder's input range (e.g., 10 mV) and can be subtracted out from recordings. However, this approach, as well as other similar approaches, can create new artifacts, and do not work well because the typical artifacts saturate the recorder.

A need persists for systems and methods capable of overcoming these and other shortcomings.

SUMMARY

Exemplary systems and methods provide a miniaturized system-on-chip (SoC) that is fully-integrated, that is low noise, that is low power, and/or that supports simultaneous neural recording and microstimulation. Further advantages and features of the invention will be apparent from the remainder of this document in conjunction with the associated drawings.

In accordance with one aspect of the present disclosure, an implantable neuromodulation system is provided comprising at least one stimulation microelectrode, at least one microelectrode, and a frequency-shaping amplifier (FSA). The at least one stimulation microelectrode is configured to deliver a desired electrical stimulation to a neuronal population. The at least one recording microelectrode is configured to receive neural signals from the neuronal population. The FSA is coupled to the at least one recording microelectrode. The FSA is configured to allow for simultaneous electrical recording and electrical stimulation of the neuronal population.

In accordance with another aspect of the present disclosure, an implantable neuromodulation system is provided comprising a microelectrode array and a frequency-shaping amplifier (FSA). The microelectrode array includes at least one stimulation microelectrode and at least one recording microelectrode. The at least one stimulation microelectrode is configured to deliver a desired electrical stimulation to a neuronal population. The at least one recording microelectrode is configured to receive neural signals from the neuronal population. The FSA is coupled to the at least one recording microelectrode. The system is configured as a system-on-chip and the FSA is configured to allow for simultaneous electrical recording and electrical stimulation of the neuronal population.

Further advantages and features of the invention will be apparent from the remainder of this document in conjunction with the associated drawings.

BRIEF DESCRIPTION OF THE DRAWINGS

FIG. 8A provides an illustration of an exemplary System-on-Chip (SoC) and corresponding auxiliary circuits in accordance with the present disclosure.

FIG. 8B is an image of a prototype of the exemplary SoC and corresponding auxiliary circuits of FIG. 8A.

FIG. 14A provides results of in vivo testing of an exemplary system without microstimulation. In particular, FIG. 14A provides example neural recordings containing both large and small spikes.

FIG. 14B provides additional example neural recordings containing both large and small spikes as part of the in vivo testing of FIG. 14A.

FIG. 17A is a graph that provides a monitoring of a stimulated neural population using a Blackrock recorder.

FIG. 17B is a graph that provides a monitoring of a stimulated neural population in accordance with the present disclosure.

FIG. 20A provides results of in vivo testing of an exemplary version of the chip.

FIG. 20B provides results of in vivo testing of a prior system ("Blackrock") using the same "NeuroNexus" electrode used in the testing of FIG. 20A and also in an unshielded environment.

FIG. 20C provides a detected neural spike cluster from the experiment represented in FIG. 20A.

FIG. 20D provides another detected neural spike cluster from the experiment represented in FIG. 20A.

FIG. 20E provides yet another detected neural spike cluster from the experiment represented in FIG. 20A.

DETAILED DESCRIPTION

Exemplary systems and methods provide a neurotechnology that allows for continuous, simultaneous neural recording and electrical microstimulation, enabling bidirectional communication with brain circuits. For example, the systems and methods described herein allow for a system-on-chip (SoC) that supports simultaneous electrical recording and electrical microstimulation from/to the same neuronal population. Applications include brain science research as well as healthcare delivery. The techniques discussed here address several challenges in neural interfacing, including the improvement of signal-to-noise ratios.

Bidirectional communication with the brain can occur with enhanced cellular resolutions. Certain configurations provide a miniaturized, implantable system-on-chip (SoC) that is low-power, that is lightweight, and/or that can support continuous neural recording before, during, and after electrical microstimulation.

In different configurations, exemplary SoC systems may be, for example, 2-channel, 16-channel, 48-channel, and 144-channel. An exemplary 144-channel system may occupy, for example, a silicon area of 4 mm$^2$. Each stimulator can be configured for voltage-mode or current-mode operation.

Figure 1:
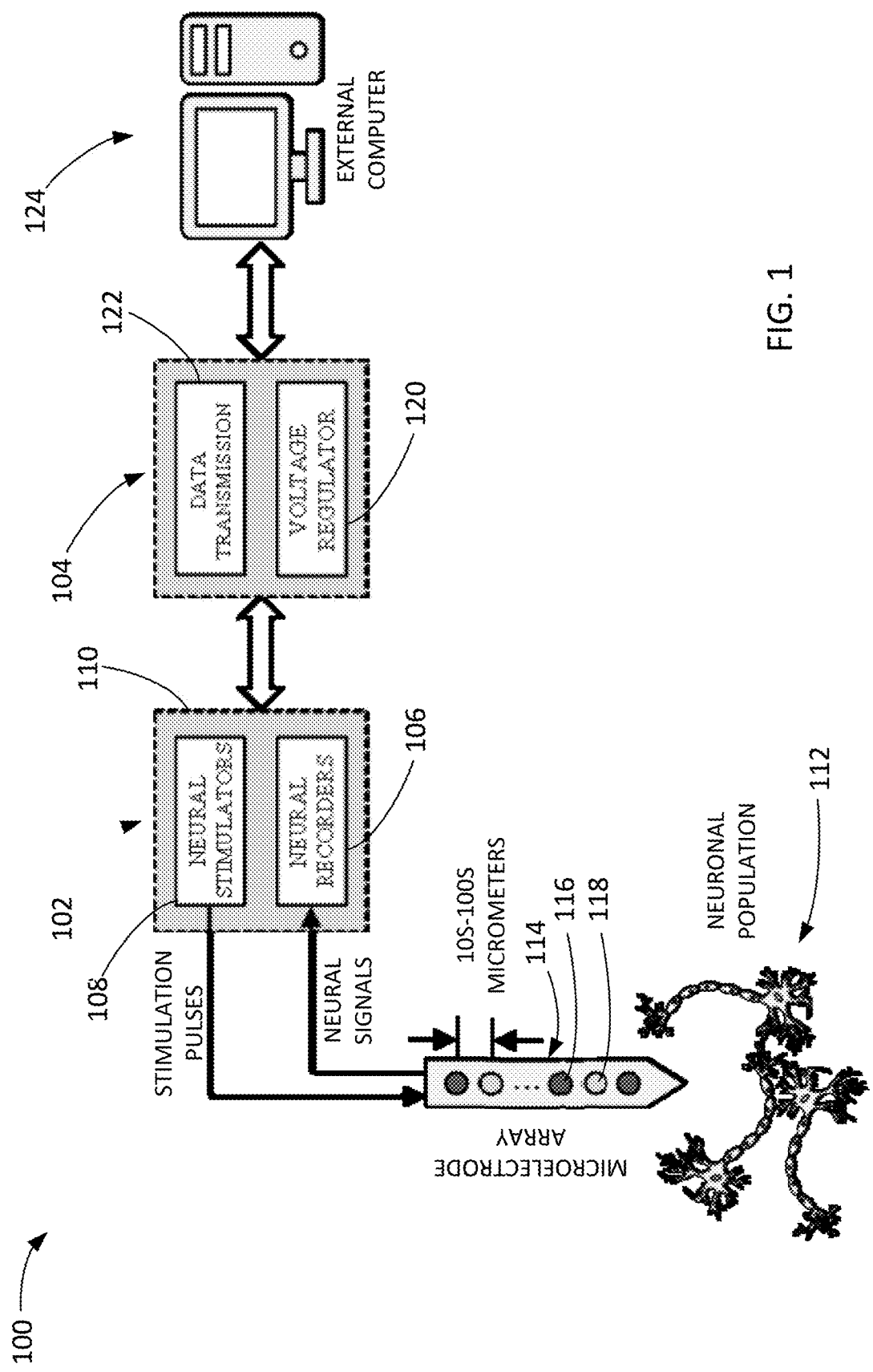
FIG. 1 provides an illustration of a system capable of bidirectional closed-loop neuromodulation in accordance with the present disclosure.

FIG. 1 shows an exemplary closed-loop neuromodulation system 100 including a system-on-chip (SoC) 102 and auxiliary circuits 104. The SoC 102 has fully-integrated neural recorders 106 and stimulators 108 incorporated on a millimeter-sized silicon chip. In some instances, the neural recorders 106 and the stimulators 108 can be implemented on the chip in a high-voltage CMOS process. The recorders 106 and stimulators 108 interface with the neuronal population 112 through a single microelectrode array 114 consisting of recording electrodes 116 and stimulation electrodes 118. The spacing between microelectrodes 116, 118 is only tens to hundreds of micrometers, which allows bidirectional communication, i.e. recording and stimulation, from/to the same neuronal population 112.

In addition, the operation of the SoC 102 is facilitated by the customized auxiliary circuits 104. The auxiliary circuits 104 are implemented using off-the-shelf components and comprise voltage regulators 120 and data transmission circuits 122. The function of the voltage regulators 120 and the data transmission circuits 122 is to power the SoC 102 and relay the data between SoC 102 and an external computer 124 via a wired or wireless communications interface (such as a single USB), respectively.

Figure 2:
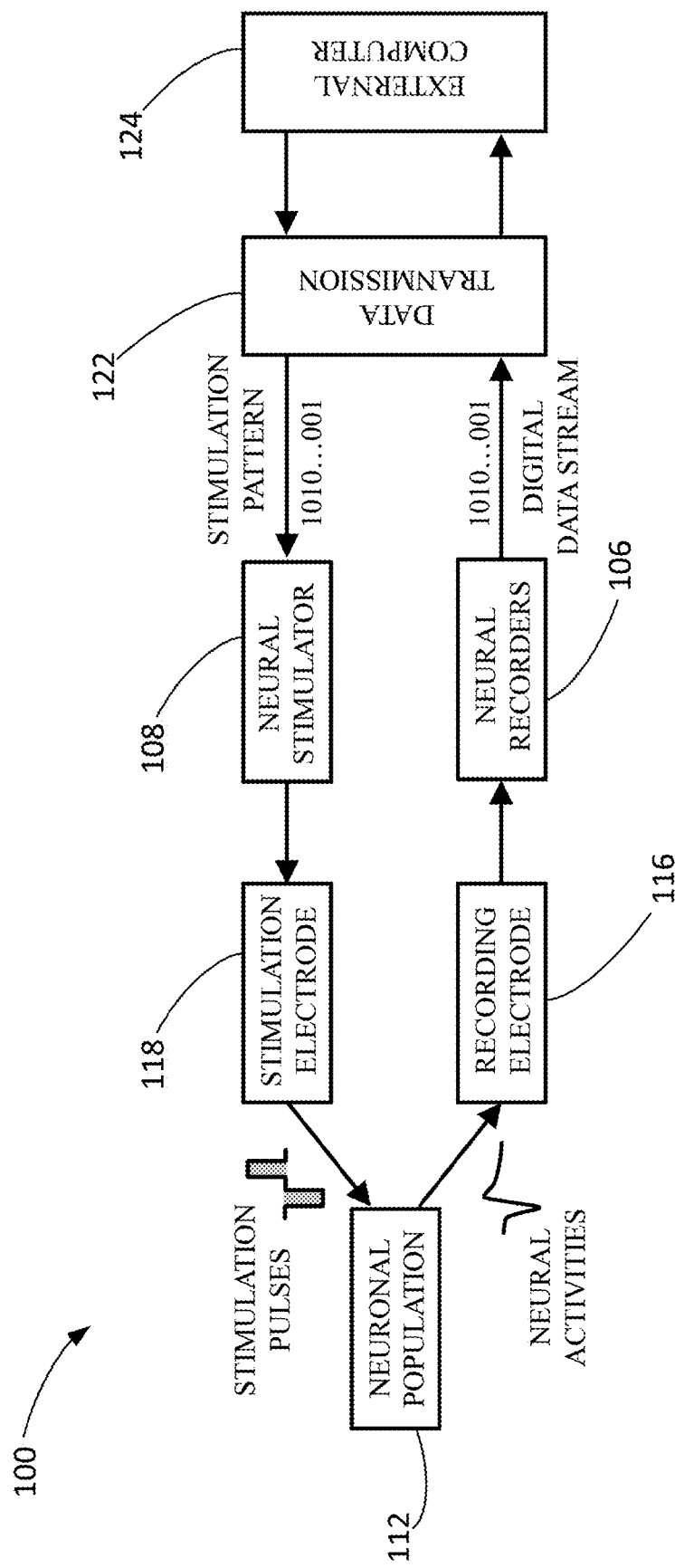
FIG. 2 is an exemplary simplified block diagram of the components of one bidirectional stimulation/recording channel in the system of FIG. 1.

FIG. 2 shows the principles of operation of the proposed system 100. The recorders 106 acquire neural activities (e.g. action potentials/spikes, local field potentials, etc.) through recording microelectrodes 116 and convert them into a digital data stream. Neural data are packaged and relayed to the external computer 124 through the data transmission layer 122 implemented in the auxiliary circuits 104. The external computer 124 analyzes neural activities and produces a stimulation pattern. The pattern is encoded and relayed back to the stimulators 108 on the SoC 102. The stimulators 108 deliver stimulation pulses to the same neuronal population 112 through adjacent stimulation microelectrodes 118, thus closing the loop of the neuromodulation system 100.

Figure 3:
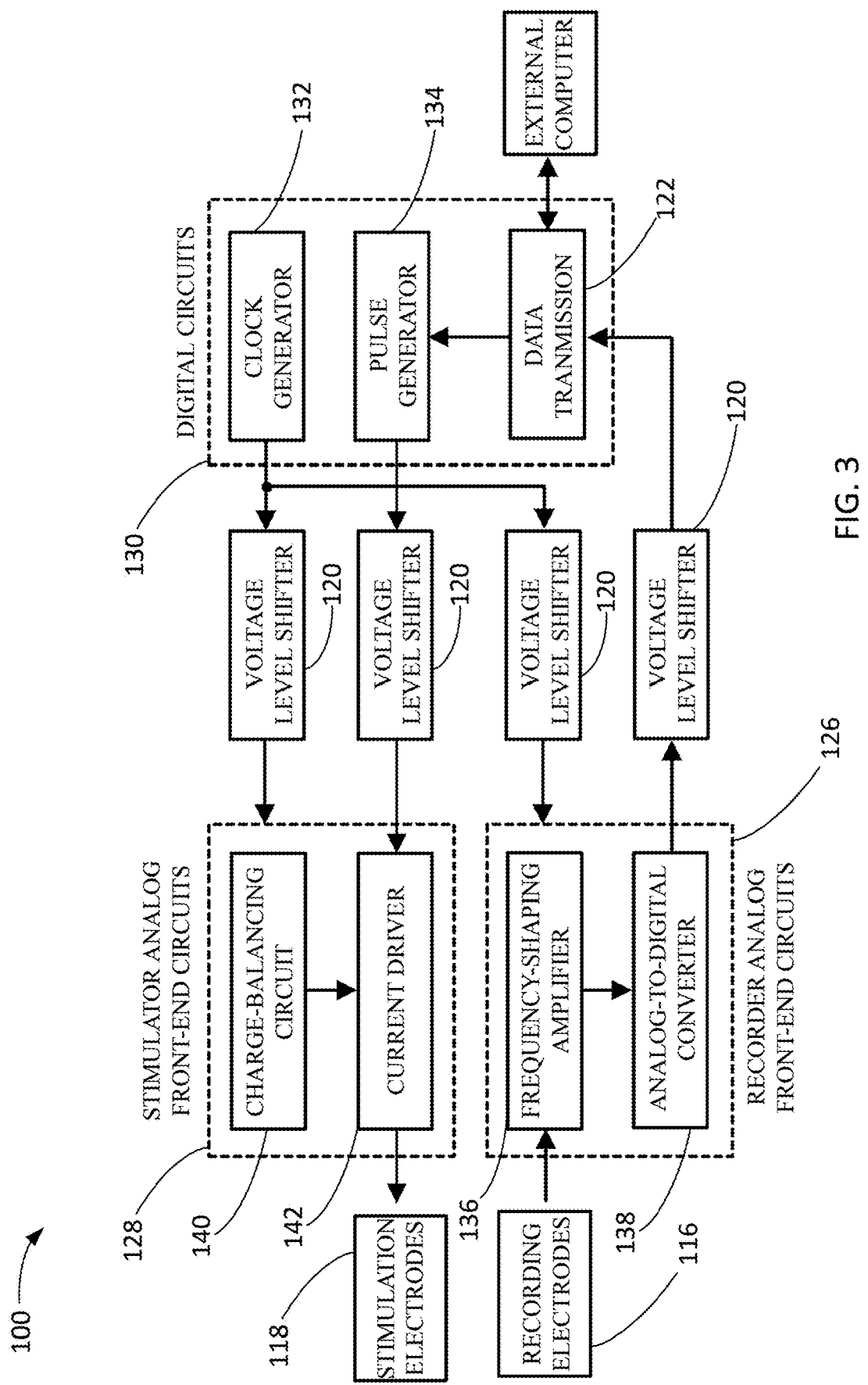
FIG. 3 is an exemplary simplified block diagram showing additional components of the bidirectional stimulation/recording channel in the system of FIG. 2.
Figure 4:
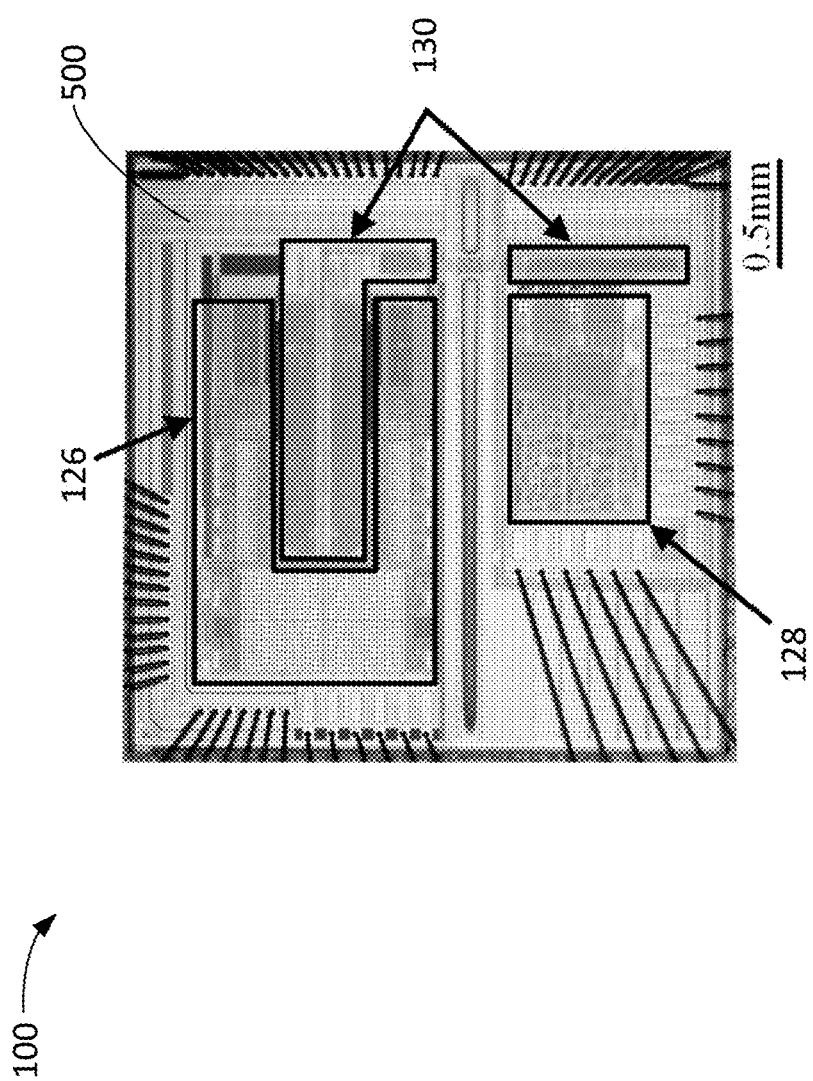
FIG. 4 is an image of a micrograph containing the SoC of FIG. 1.
Figure 5:
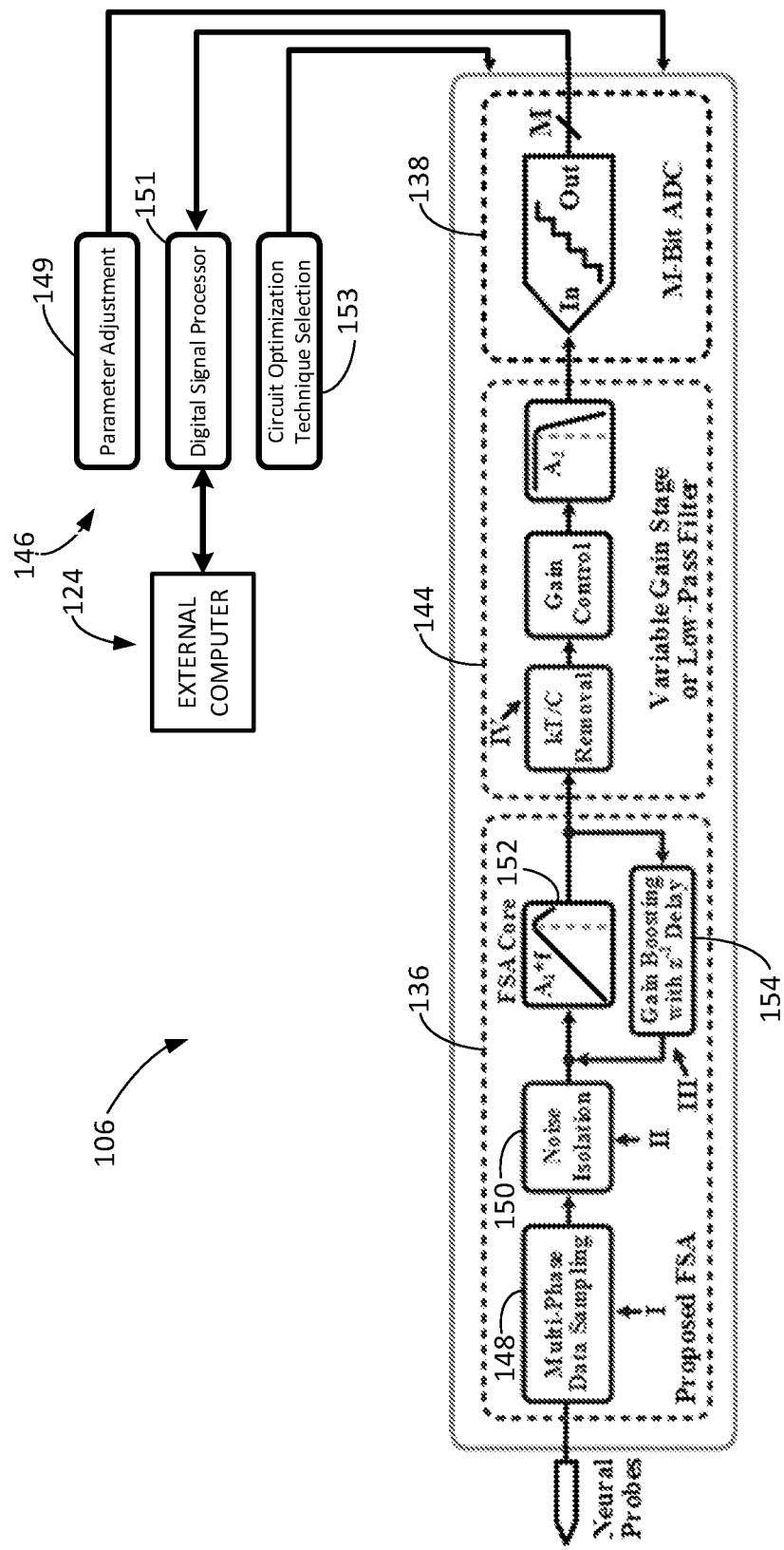
FIG. 5 provides an exemplary simplified block diagram of a recorder channel in the system of FIG. 1.
Figures 6A, 6B:
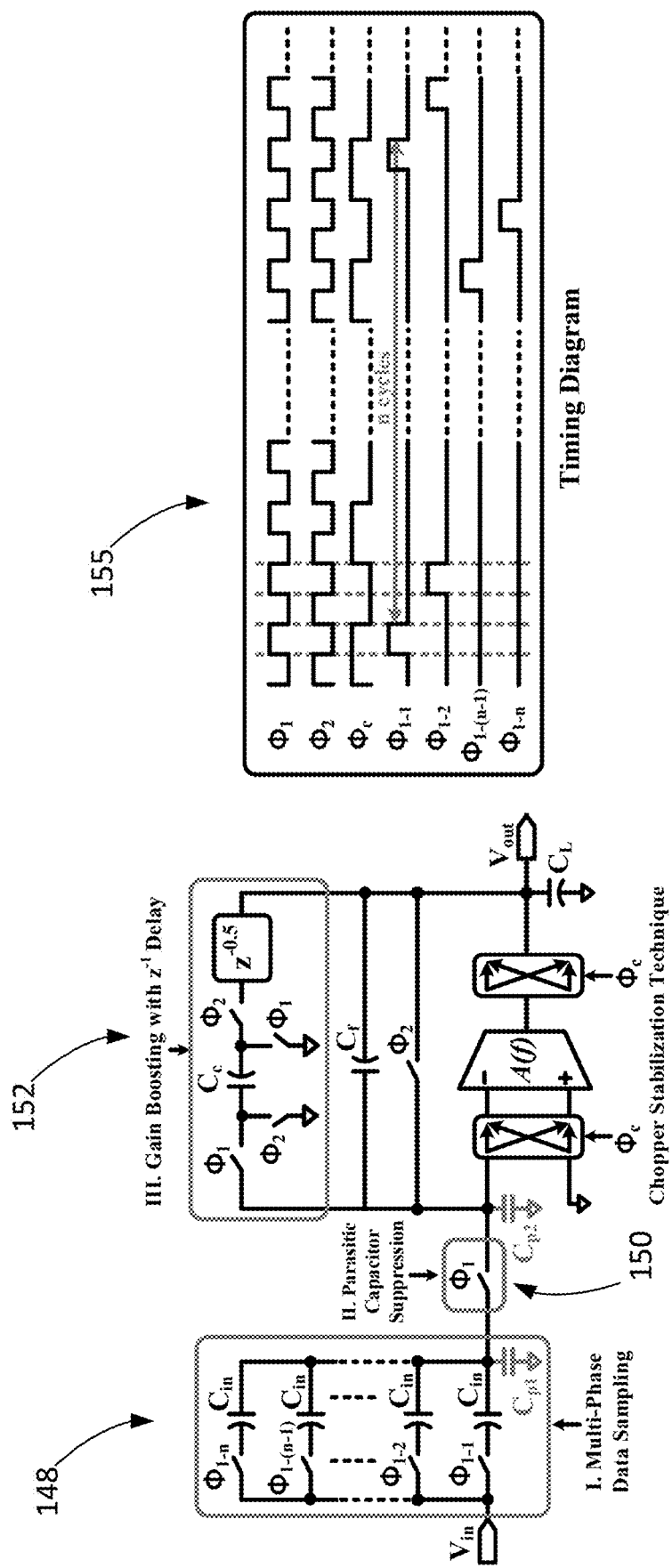
FIG. 6A is a circuit diagram that provides circuit schematics for a frequency-shaping amplifier (FSA).
FIG. 6B provides a timing diagram for the various phases applied to the FSA.
Figure 7:
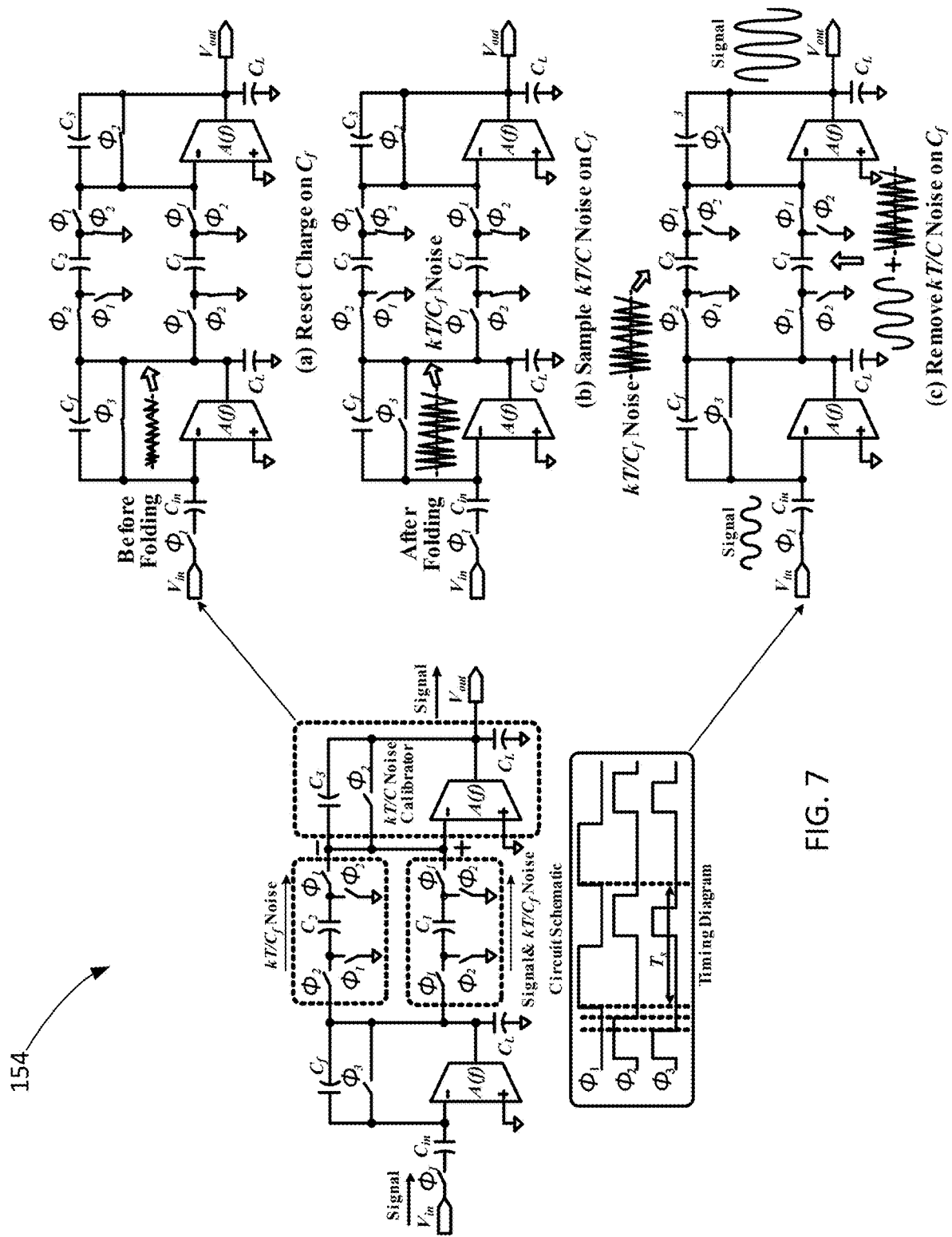
FIG. 7 is a circuit diagram that provides circuit schematics for a modified auto-zero "kT/C" noise cancellation scheme in a variable gain stage or low-pass filter.

FIG. 3 shows the functional components of the SoC 102 and the auxiliary circuits 104. The system 100 comprises of 3 primary blocks: the recorder analog front-end circuits 126, the stimulator analog front-end circuits 128, and the digital circuits 130, which can all be implemented on a single silicon chip 500 (as shown in FIG. 4). Each block 126, 128, 130 is designed using a different set of MOS transistors and powered by a separated voltage rail, as shown in FIGS. 5-7. They are physically isolated from each other on the chip as shown in the micrograph of FIG. 4. This is done to prevent noises and interferences from one block affecting the performance of the others. All interactions between the blocks are carried out using digital control signals and are facilitated by the voltage regulators or level shifters 120.

The digital circuits 130 are implemented with low-voltage transistors and powered by a 1.8V rail. The digital circuits 130 further include a clock generator 132, a pulse generator 134, and the data transmission layer 122. The function of the digital circuits 130 is to generate the clocks and control signals, synchronize the recorder's and stimulator's operations, as well as to provide the data transmission layer 122. The recorder analog front-end circuits 126 are implemented with mid-voltage transistors and powered by a 5V or ±2.5V rail. The recorder analog front-end circuits are comprised of frequency-shaping amplifiers 136 and analog-to-digital converters (ADC) 138, of which function is to amplify, filter and digitize the neural signals while suppressing the stimulation artifacts. The stimulation analog front-end circuits 128 are implemented with high-voltage transistors and powered by a 20V or ±10V rail. The stimulation analog front-end circuits 128 are comprised of charge-balancing circuits 140 and current drivers 142, which function is to generate the stimulation pulses and regulate the charge-balancing process.

Previous neuromodulation systems use off-the-shelf components while others use multiple chips approach, i.e. the stimulator is fabricated in a high-voltage CMOS process while the recorders are fabricated in a low-voltage, high-density process, to implement the system. In contrast, the present disclosure provides a SoC 102 that has all essential components fully integrated on a single chip. This is technically challenging because different circuits blocks operating at various voltage rails can degrade the performance of the others, especially the recorder 106. The issue is mitigated in the disclosed design by employing block isolation and by utilizing an enhanced FS amplifier design (shown in FIG. 6A) which is insensitive to stimulation artifact as well as internal interferences. The FS amplifier 136 is designed with several circuit techniques aimed at reducing noise and suppressing stimulation artifacts. The fully-integrated SoC 102 helps reduce the overall size and power consumption of the system by removing the packaging overheads. At the same time, it allows high-bandwidth, low latency interactions between the recorder and stimulator for closed loop operations.

Referring now to FIG. 5, a functional block diagram of the recorder 106 is illustrated. The recorder 106 comprises of the frequency-shaping amplifier (FSA) 136, a variable gain stage and/or low-pass filter 144, the high-resolution analog-to-digital converter (ADC) 138, and supporting digital signal processing (DSP) blocks 146. The DSP blocks 146 include a parameter adjustment block 149, a digital signal processor 151, and a circuit optimization technique selection 153.

The key component, the FSA 136, has a gain proportional to signal frequency $$Ac(f)=2\pi f C_{in}/(f_s C_f)$$

where Ac(f) is the closed-loop gain of the FSA 136, $f_s$ is sampling frequency, f is signal frequency, $C_{in}$ and $C_f$ are the input capacitor and feedback capacitor of the FSA 136, respectively. As the FSA 136 is implemented with switched-capacitor circuits, it is well known that the switch-on resistor $R_{on}$ brings "kT/C" noise on capacitors. For example, assuming $C_{in}$ and $C_f$ are 3 pF and 30 fF, respectively, the appeared "kT/C" noise referred to the recorder input is around 360 μV, which is too high to accurately acquire full-spectrum neural activities and also prohibits any impedance improvement. To solve this problem, in some instances, a delayed-signaling noise cancellation scheme can be used to reduce kT/C noise by 2 orders, where the input-referred noise is 13 μV for recording LFPs and 7 μV for recording spikes, respectively.

In the illustrated FS architecture, several additional circuit techniques are included to further reduce the input-referred noise power by 10 times and the total power consumption by 7 times in comparison with our previous publications. As noted in FIG. 5, the enhanced circuits include a multi-phase data sampling and processing technique 148, a modified parasitic capacitor suppression method 150, a feedback gain boosting path with a $z^{-1}$ delay 152, and a modified auto-zero "kT/C" noise cancellation scheme 154.

The multi-phase data sampling and processing technique 148 is configured to boost the closed-loop gain by n times without decreasing sampling frequency $f_s$ or reducing input impedance, where the number n is adjustable based on recording applications and situations. A detailed circuit implementation is shown in FIG. 6A. A timing diagram 155 of the various phases (e.g., $\Phi_1$, $\Phi_{1-1}$, $\Phi_{1-2}$, $\Phi_{1-(n-1)}$, etc.) is additionally provided in FIG. 6B.

The modified parasitic capacitor suppression method 150 of the FSA 136 is configured to block charge transfer from amplifier input parasitic capacitors $C_p$ to $C_f$ which otherwise would increase the amplifier input noise. A detailed circuit implementation is shown in FIG. 6A.

To further reduce noise at low frequencies, the feedback gain boosting path with a $z^{-1}$ delay 152 is introduced to transfer the charge on $C_c$ to $C_f$ with a coefficient of $\alpha=C_c/C_f$ during $\Phi_1$. A detailed circuit implementation is shown in FIG. 6A.

The modified auto-zero "kT/C" noise cancellation scheme 154 is configured to allow a more complete removal of kT/C noise appearing on $C_f$. A detailed circuit implementation is shown in FIG. 7.

As described above, and shown in FIG. 6A, the frequency shaping architecture, in part, allows the disclosed SoC 102 to simultaneously record and stimulate a single neuronal population 112. The FS design is based on switch-capacitor circuits which are inherently insensitive to stimulation artifacts and electrode offset without requiring a sub-Hz high-pass filter, and also increase the input impedance by 5-10 fold, and compress the neural data dynamic range by 4.5-bit. As a result, the recorders 106 can suppress stimulation artifacts and avoid losing useful information by providing a wide system dynamic-range which cover full-spectrum recording from near DC to several kHz. In addition, the high input impedance characteristic of the design is desired to give more tolerance to inflammatory responses and maintain signal quality over a longer period of time, which is one of the basic requirements for chronic, high-density data acquisition applications.

As such, the SoC 102 overcomes the drawbacks of previous neuromodulation systems by allowing modulating neural circuits using electrical microstimulation while continuously recording the direct responses of the same neurons on an adjacent microelectrode with minimal latency and interruption.

Previous neuromodulation systems have relied on indirect approaches to provide closed-loop neuromodulation. They stimulate one neuronal population or brain region while recording from another population/region where the input and output neurons can be millimeters or centimeters apart. For example, in many closed-loop deep brain stimulation systems, brain activities are recorded using EEG electrodes that sit on the brain surface while electrical stimulations are delivered to deep brain structures on another set of electrodes. In contrast, in our SoC, the stimulation and recording microelectrodes are only tens to hundreds of micrometers apart which allows communicating with the same neural circuits or even the same neuron.

Previous neuromodulation systems have not allowed recording and stimulation from the same neural circuits simultaneously. Typically, electrical microstimulation from a nearby microelectrode creates acute artifacts that are many orders of magnitude larger than the neural signals. These artifacts at best can cause saturation on the recorder's inputs masking the signals of interest, and at worst can damage the low-power, low-noise recording circuits. In these systems, recorders are often shut down/blanked or reset during stimulation and require tens to hundreds of milliseconds to recover to the normal operation. In contrast, the disclosed SoC can acquire neural signals continuously before, during and after stimulation artifact. This is achieved by utilizing the architectural advantages of the frequency-shaping (FS) amplifier with enhanced circuit techniques described above. Our system can suppress large-amplitude stimulation artifact and require only a few milliseconds for recovery. As a result, the SoC 102 can facilitate direct and uninterrupted neuro-feedback with minimal latency.

Previous neuromodulation systems have relied on ultra-high dynamic range amplifiers to acquire both stimulation artifacts and neural signals without saturation as well as advanced digital signal processing techniques to remove the artifacts in post-processing. However, compared to our SoC, the analog front-end of such ultra-high DR amplifiers requires much higher supply voltage and power consumption which is not feasible for miniaturized biomedical devices. The size of these systems is also much larger and only suitable for benchtop experiments. In the disclosed system, the stimulation artifacts are suppressed at the analog front-end by the architecture of the FS amplifier 136, thus requiring minimal DR and post-processing to acquire and extract neural signals.

Figure 9A:
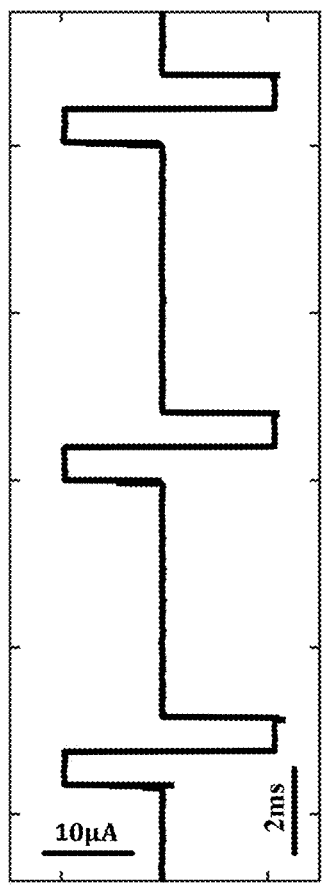
FIG. 9A provides benchtop measurement results in which an exemplary system is connected to microelectrodes immersed in saline water for functional testing, and in particular, measurements of stimulation current produced by the system.
Figure 9B:
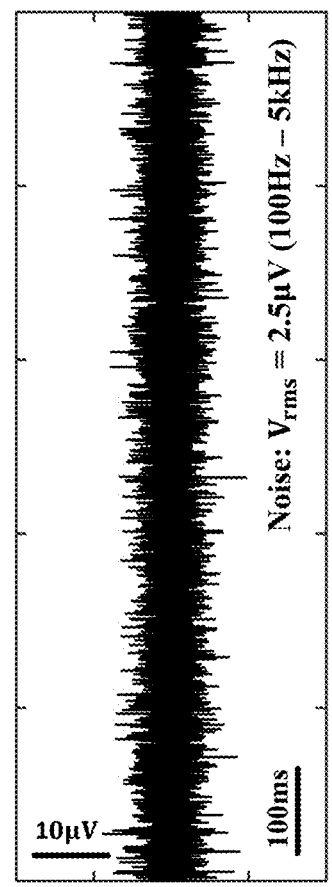
FIG. 9B provides measured noise referred to the recorder input of the system of FIG. 9A. The measured noise includes electrode noise, circuit noise, and ambient interferences picked up by wires.

FIGS. 8A and 8B show an illustration and a photo, respectively, of an exemplary miniaturized prototype 200 comprising the exemplary SoC 102 and auxiliary circuits 104 that can be used in neuromodulation experiments in a small-animal model. It will be understood that "SIDE A" and "SIDE B" are opposed sides of the same miniaturized prototype 200. FIGS. 9A and 9B show measurement results, where the SoC is connected to electrodes in saline to test the electrical properties.

Figure 10:
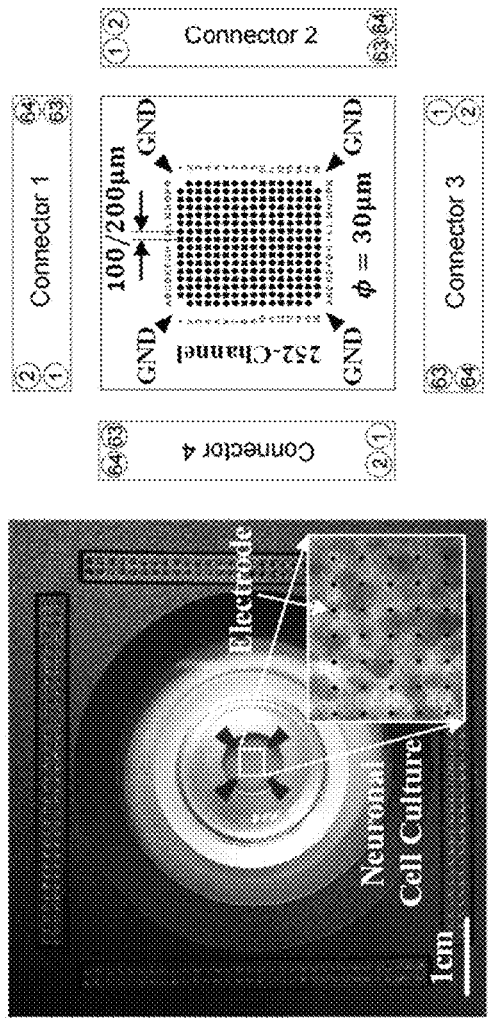
FIG. 10 provides a microelectrode array (MEA) configuration used in in vitro experiments with current mode microstimulation and recording. Two versions of MEAs, 30 µm electrode diameter with either 100 µm or 200 µm pitch size, were used.
Figure 11:
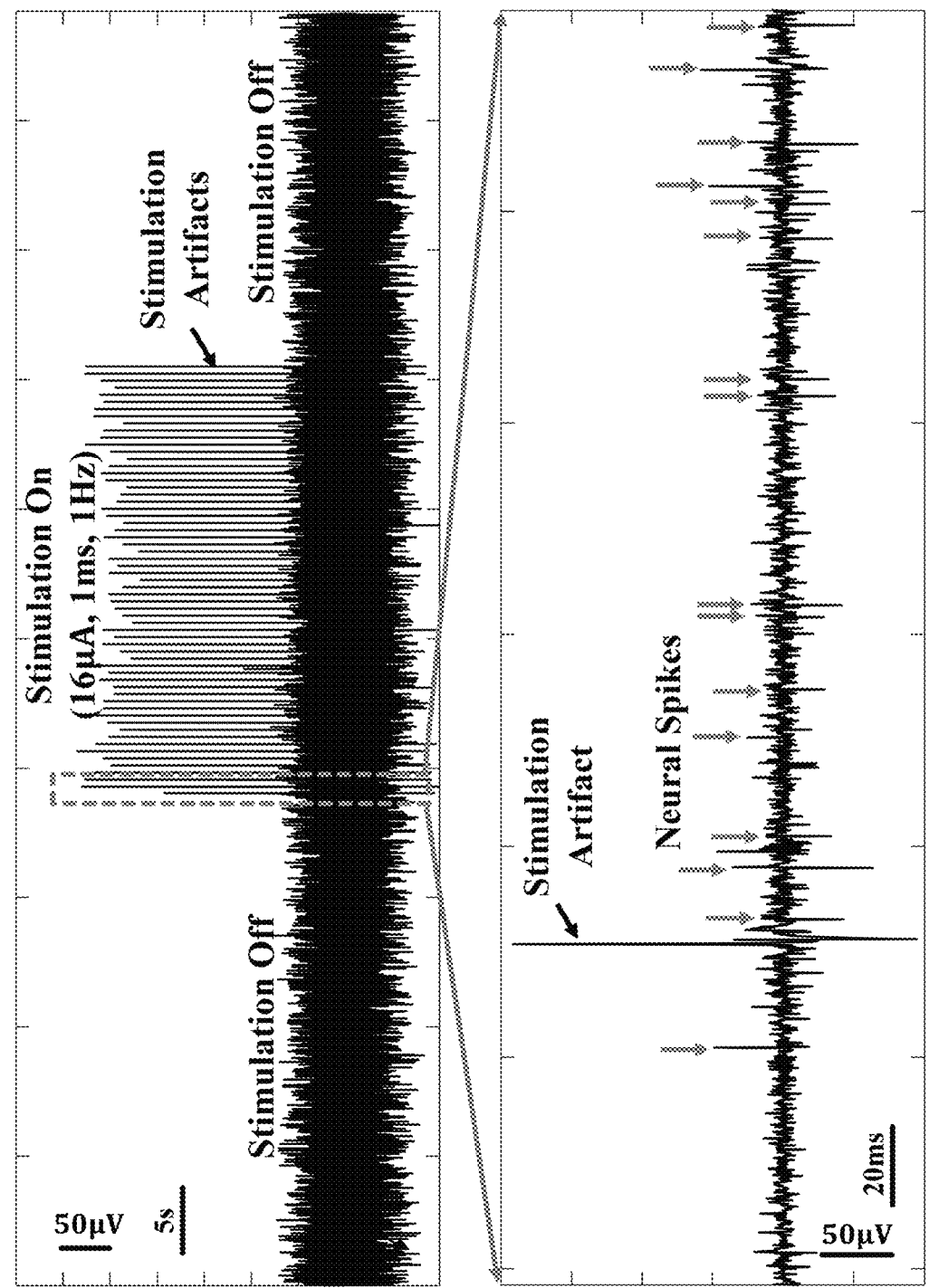
FIG. 11 provides a neural recording with a train of monophasic, current-mode stimulation pulses, illustrating that a train of electrical pulses can adjust firing rates of neurons. At the top of FIG. 11 is a 1-minute window that shows neural data and stimulation artifacts. At the bottom is a zoomed-in plot that shows the noise floor, spikes, and a stimulation artifact in a portion of the window.

An exemplary SoC in accordance with the present disclosure was tested in vitro with cell culture. E18 rat embryonic brain tissue was harvested and grown on a microelectrode array (MEA, MultiChannel Systems). The MEA dish had 256 recording electrodes, 30 μm contact diameter, and 100 μm or 200 μm pitch size as shown in FIG. 10. Recording experiments were performed under a variety of stimulation conditions: monophasic, biphasic, pulse train, current amplitude from 2 μA to 64 μA, pulse width from 100 μs to 2 ms, and stimulation frequency from 0.1 Hz to 10 Hz. FIG. 10 provides results of an example recording under current-mode microstimulation.

Figure 12A:
FIG. 12A provides firing rate versus time, in which current mode stimulation was turned on for 60 seconds and then turned off. Neural firings change from 10 Hz (baseline) to 30 Hz (stimulation on), and back to 10 Hz (stimulation off).
Figure 12B:
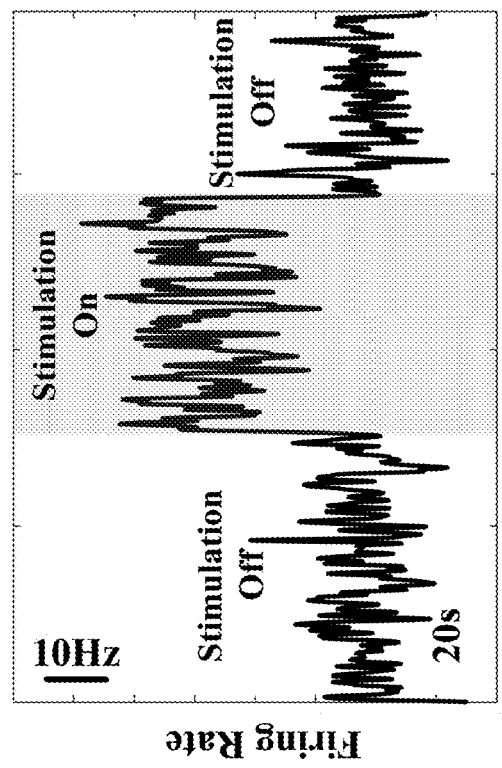
FIG. 12B provides three well-isolated spike clusters that are detected from in vitro recording with microstimulation.
Figure 13B:
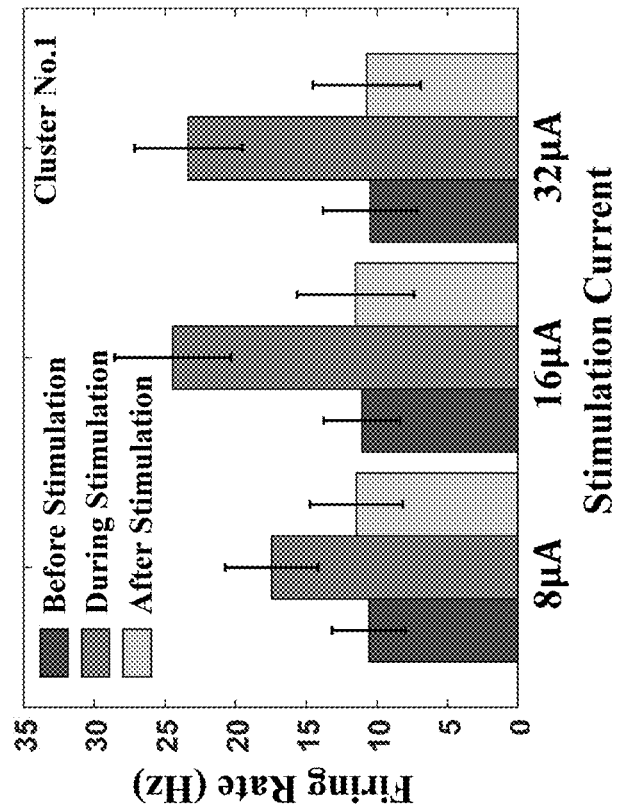
FIG. 13B provides firing rates of a second, separate neuron cluster before, during, and after stimulation. The firing rates increase during stimulation and return to the baselines when stimulation is turned off.
Figure 13A:
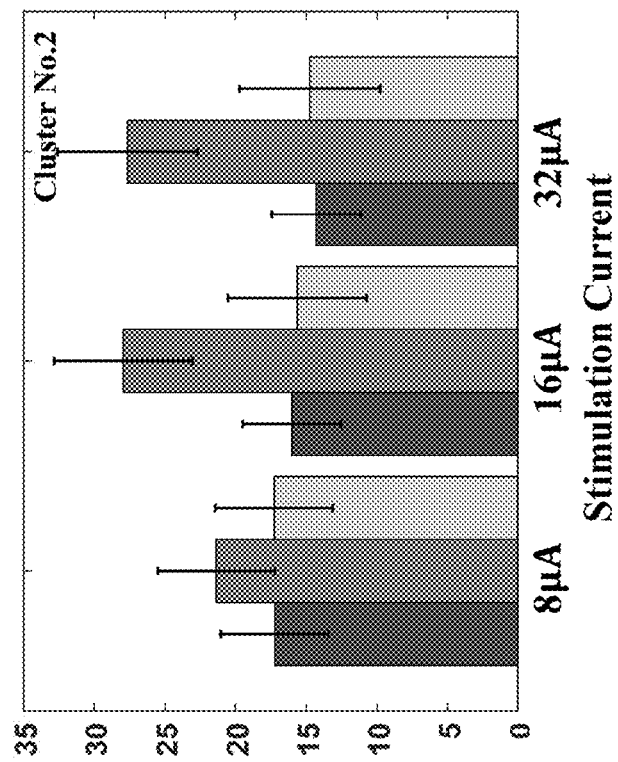
FIG. 13A provides firing rates of a first neuron cluster before, during, and after stimulation. The firing rates increase during stimulation and return to the baselines when stimulation is turned off.
Figure 15A:
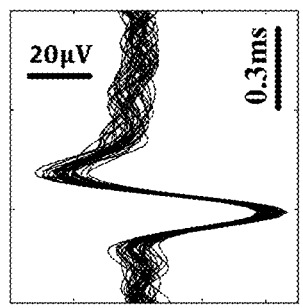
FIG. 15A provides a spike cluster detected from an electrode site. The peak-to-peak amplitude of the spike cluster is 28 µV, corresponding to a SNR of 6.7.
Figure 15C:
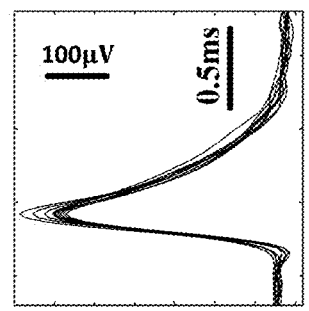
FIG. 15C provides another spike cluster detected from the electrode site of FIG. 15A. The peak-to-peak amplitude of the spike cluster is 240 µV, corresponding to a SNR of 57.2.
Figure 15B:
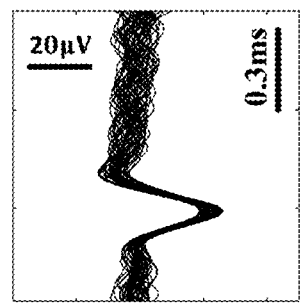
FIG. 15B provides another spike cluster detected from the electrode site of FIG. 15A. The peak-to-peak amplitude of the spike cluster is 65 µV, corresponding to a SNR of 15.5.
Figure 15D:
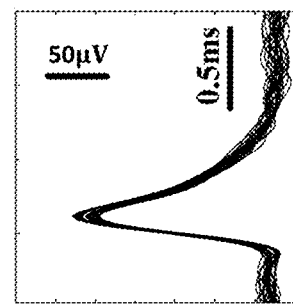
FIG. 15D provides another spike cluster detected from the electrode site of FIG. 15A. The peak-to-peak amplitude of the four spike clusters is 600 µV, corresponding to a SNR of 143.8.
Figure 16A:
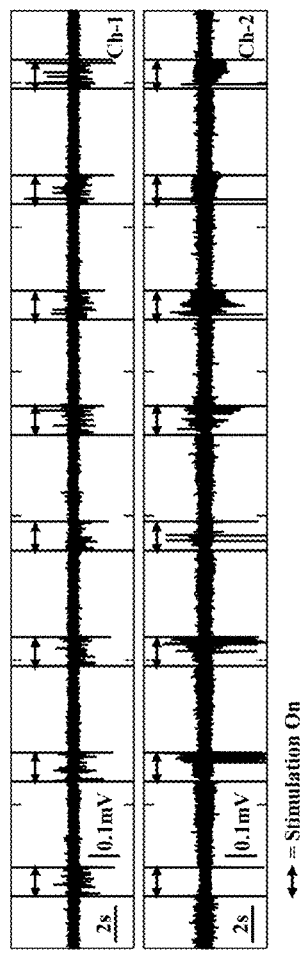
FIG. 16A represents an in vivo experiment with voltage mode microstimulation and recording. In the neural recording with voltage mode microstimulation of FIG. 16A, the bars indicate stimulation "on." When the stimulation was on, an exemplary system could have artifacts recorded and removed on-the-fly, where the leftover artifacts are localized and less than 1 mV.
Figure 16B:
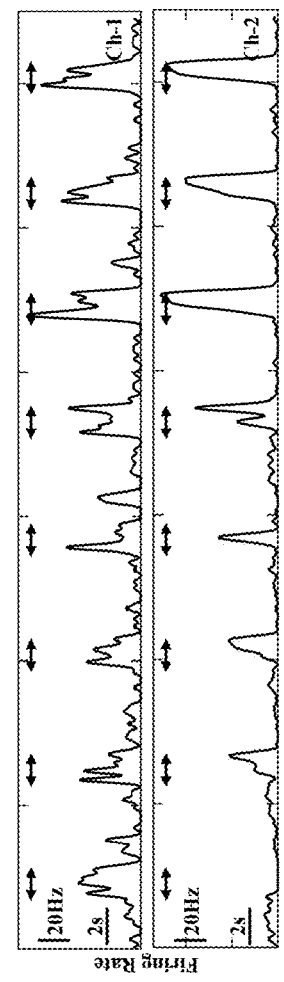
FIG. 16B is a graph that provides detected spike firing rate versus time in the experiment of FIG. 16A, where the firing rate is clearly modulated by stimulation.
Figure 16C:
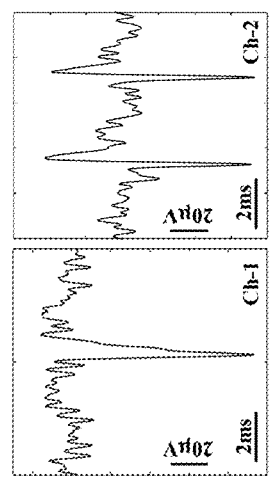
FIG. 16C is a graph that provides an example spike recording under electrical microstimulation in the experiment of FIG. 16A.
Figure 16D:
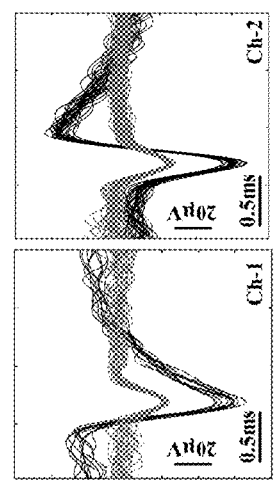
FIG. 16D is a graph that provides another example spike recording and spike cluster under electrical microstimulation in the experiment of FIG. 16A.
Figure 16E:
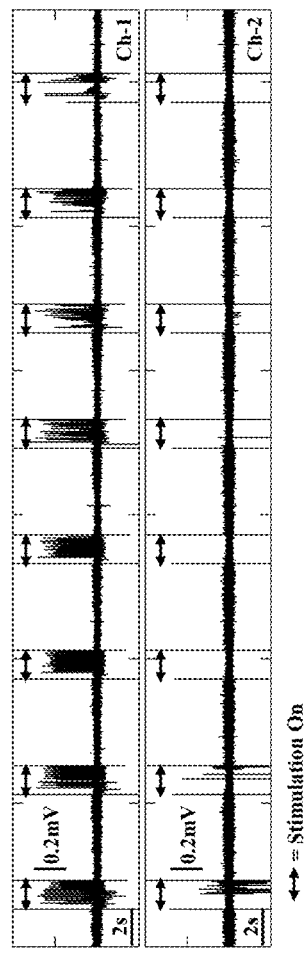
FIG. 16E is a graph that provides neural recording with voltage mode microstimulation in an experiment corresponding with the same probe and animal preparation as in FIG. 16A, but at a different cortical depth.
Figure 16F:
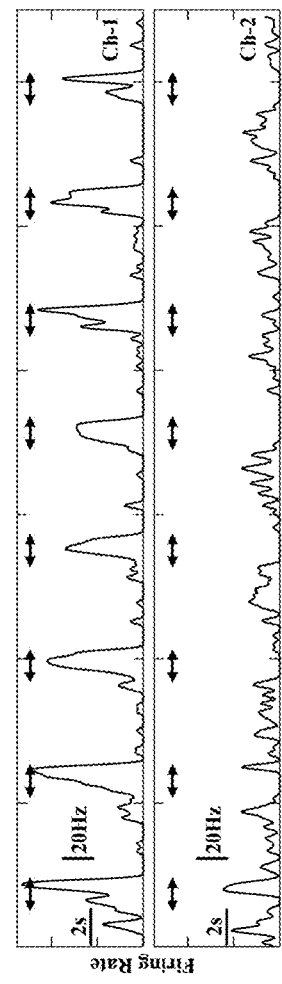
FIG. 16F is a graph that provides detected spike firing rate versus time in an experiment corresponding with the same probe and animal preparation as in FIG. 16B, but at a different cortical depth.
Figure 16G:
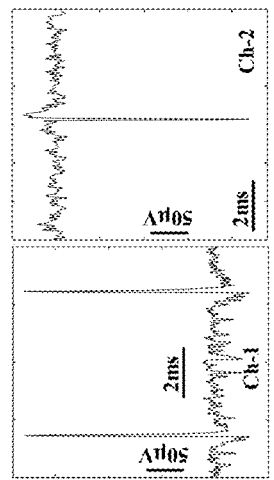
FIG. 16G is a graph that provides an example spike recording under electrical microstimulation in the experiment of FIG. 16E.
Figure 16H:
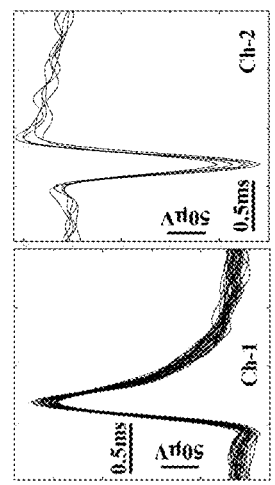
FIG. 16H is a graph that provides another example spike recording and spike cluster under electrical microstimulation in the experiment of FIG. 16E.

As with other commercial systems, the MEAs of Multi-Channel Systems were saturated by artifacts when the stimulator was turned on. By comparison, the recorder used could track and remove stimulation artifacts, not causing any saturation. To validate the recorded neural data, standard methods to detect and sort neural spikes with recommended parameters were used. FIG. 12B shows three distinct spike clusters recorded from one electrode site as an example. FIG. 12A shows firing rate versus time. A train of current pulses was turned on for 60 seconds and then turned off. The firing rates increased considerably from 10 Hz to 30 Hz when the stimulator was turned on and back to 10 Hz after the stimulator was turned off. This testing demonstrated combined recording and electrical stimulation.

For in vivo testing, high impedance NeuroNexus probes (14 μm diameter) were used. The probe was connected to the exemplary SoC through an Omnetics nano connector. Recordings were taken at multiple depths and locations. The total RMS noise was 4.2 μV when the animal was sacrificed, integrated from 100 Hz to 5 kHz. The neural signal amplitude, defined as the peak-to-peak amplitude of spike clusters, is between 25 μV and 700 μV. Increasing the bandwidth can increase the spike amplitude but not much change on the signal-to-noise ratio. In previous neuromodulation systems with the probes that were used in the in vivo tests, single-unit recording amplitude has typically varied, depending on a number of factors, between 50-800 μV. The disclosed SoC was able to achieve lower noise and can enhance signal quality and detect smaller spike clusters. FIGS. 14A and 14B provide example neural recordings with both large and small spikes.

FIGS. 15A-15D provide a spike clusters detected from an electrode site. Standard high impedance "NeuroNexus" probes (3 mm length, 15 μm thickness, and 177 μm² site area) were used. The probe was connected to an exemplary system through an Omnetics nano connector. The recording was from the sensory-motor cortex of a rat preparation with 700 μm penetration. Noise estimated based on data segments without noticeable spikes was 4.2 μV. Data was filtered at 100 Hz-5 kHz.

Neural recording with microstimulation was performed, including both voltage mode (0-1.8V) and current mode (2-64 μA) stimulation. FIG. 16 shows two example recordings under voltage mode microstimulation. To trigger strong neuronal responses without damaging the electrodes, the stimulation voltage was set at 1.8V. The stimulator was turned on for two seconds and turned off for six seconds, while the recorder was turned on continuously before, during, and after stimulation. Spike clusters collected under stimulation are consistent with those detected from spontaneous activity. By adjusting the stimulation parameters such as amplitude, pattern, and pulse width, the firing rate of neurons can be changed. This demonstrated modulation of neural activity in closed-loop configurations through simultaneous neural recording and electrical microstimulation.

Regarding experimental protocols, male Sprague Dawley rats were anesthetized using isoflurane and placed on the prone position in a stereotaxic apparatus for the following procedures: (i) apply a local anesthetic prior to making the skin incision for the craniotomy, (ii) at chosen brain region, a high-speed surgical drill was used and the dura was cut open without damaging the brain, and (iii) after the craniotomy, the electrode was inserted into the desired brain location/depth through the small incision of the dura and was fixed in position.

Certain exemplary configurations include a multi-channel device ("MIST"), usable as, for example, a miniature head-stage, that can support simultaneous neural recording and electrical stimulation without saturation. Software and/or firmware, along with a (graphical) user interface, can be used to allow users to, for example, record and store data, analyze data in response to stimulation, adjust stimulation parameters, and perform closed-loop neuromodulation. To cover a broad range of applications, "MIST" can be designed in a high-voltage process with power supply up to +/−8V, helping with development and standardization of a next generation technology that allows bidirectional communication with the brain and nervous system.

Figure 18:
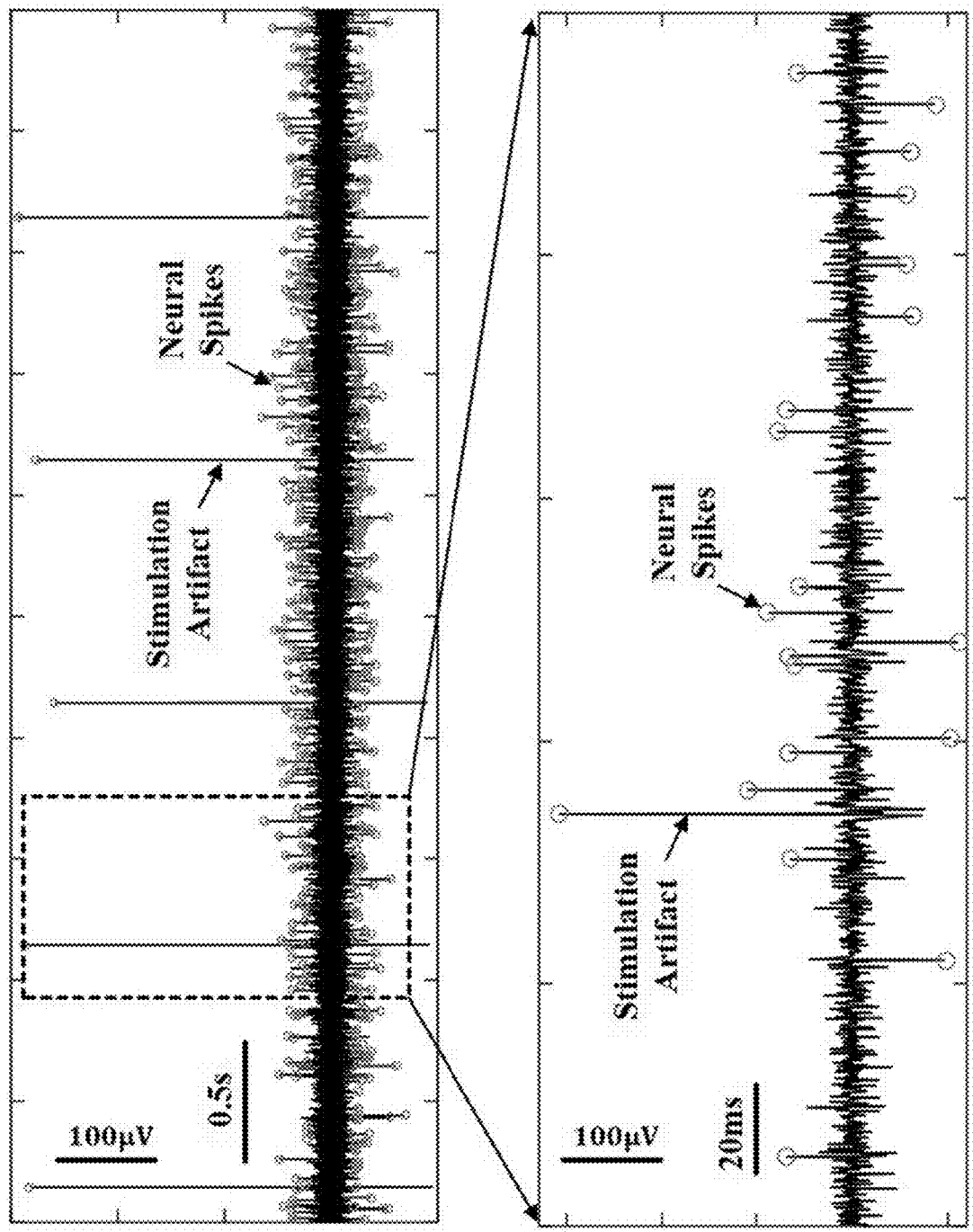
FIG. 18 provides a train of electrical pulses at 1 Hz sent to the stimulation electrode in experiments using the configuration of FIG. 10.

Referring to FIG. 18, a train of electrical pulses is illustrated. The train of electrical pulses was applied at 1 Hz and sent to the stimulation electrode in experiments using the configuration of FIG. 10. Recording was performed from both the same electrode and from adjacent electrodes. In FIG. 18, each stimulation pulse had a 1 ms width and a 16 μA amplitude. The recording was performed from an adjacent electrode. The recorder is internally synchronized with the stimulator and can reject stimulation artifacts by more than 1000-fold. The leftover stimulation artifacts are less than 500 μV and within a few milliseconds, which can be removed through offline signal processing.

Figure 19A:
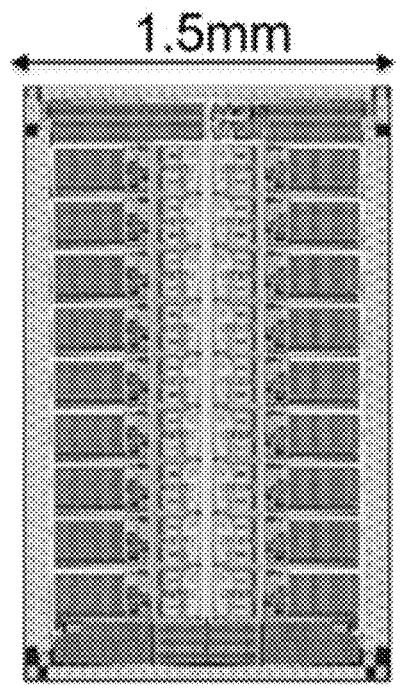
FIG. 19A represents an exemplary microchip layout with 144 channels. The chip has been designed in a low-voltage process (+/−0.6V), consumes 5 µA power, and can record from adjacent electrodes with electrical microstimulation.
Figure 19B:
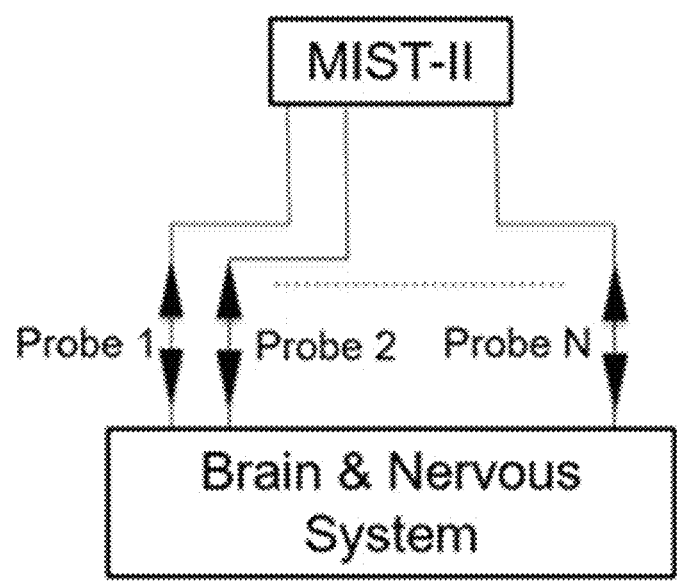
FIG. 19B illustrates an exemplary system (labeled "MIST-II") with 1000 separate channels for recording and 128 separate channels for stimulation.
Figure 21A:
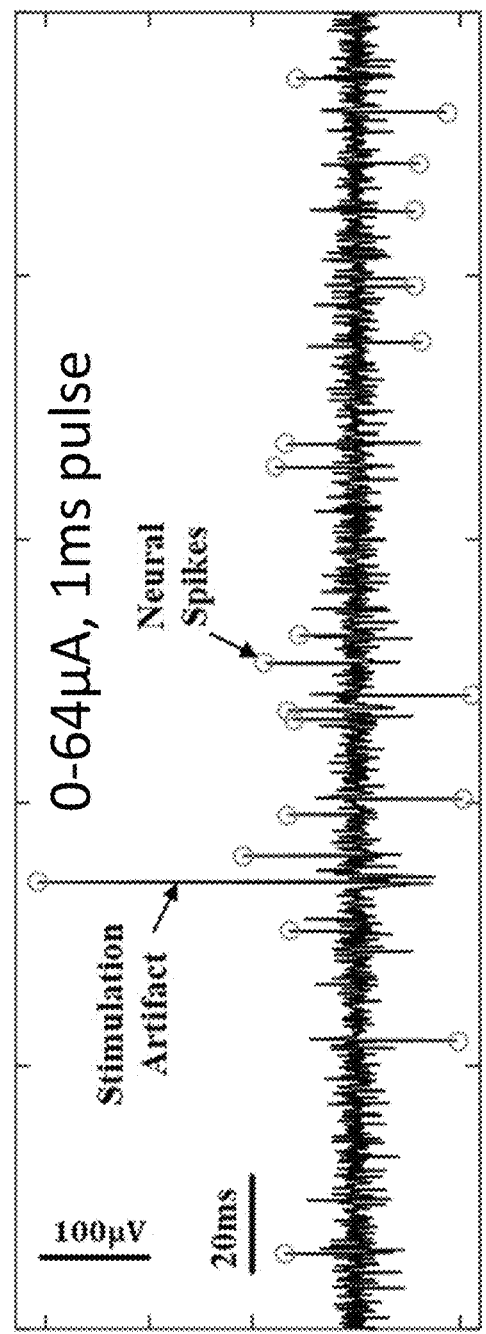
FIG. 21A is associated with in vitro neural recordings, using current-mode electrical stimulation, taken using an electrode that is 100 µm away from the stimulation electrode of an exemplary configuration of the SoC. A 1 ms, 16 µA electrical pulse was sent to a stimulation electrode.
Figure 21B:
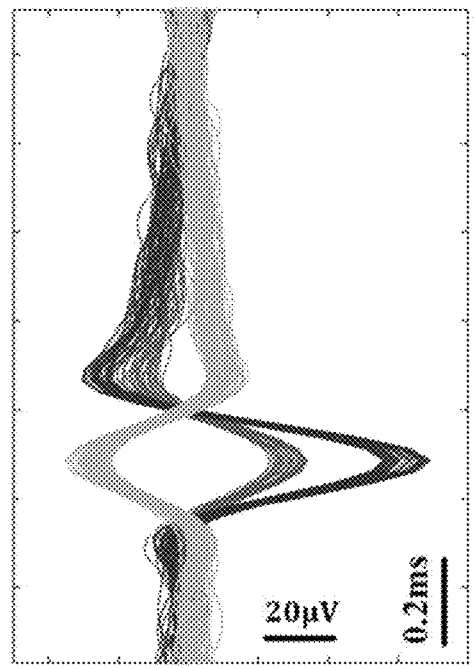
FIG. 21B provides neural spikes associated with the electrical stimulation associated with the neural recordings of FIG. 21A.
Figure 21C:
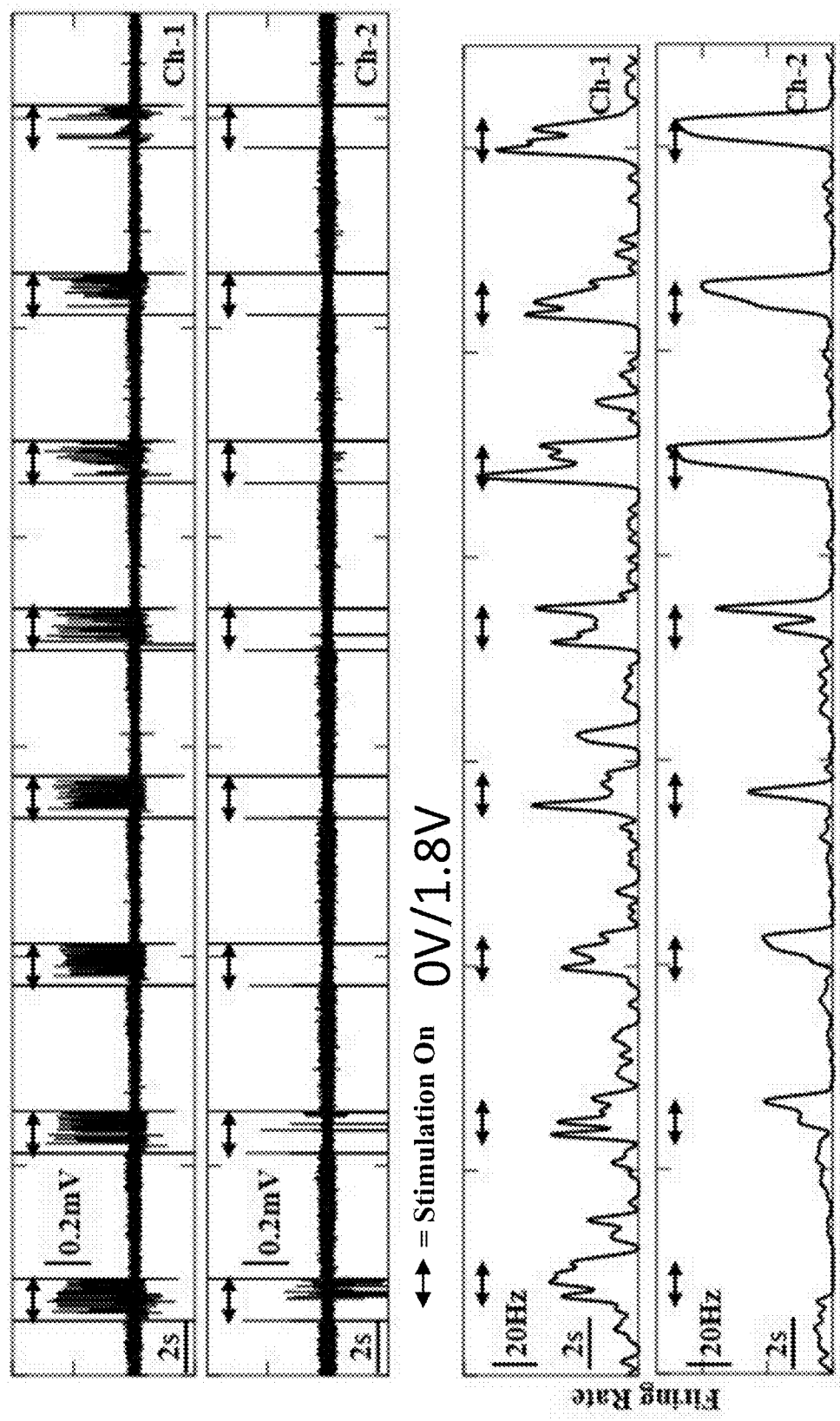
FIG. 21C represents in vivo recording with voltage-mode stimulation, in which the stimulation electrode was periodically charged to 1.8V. The horizontal arrow bars indicate the period when the stimulation electrode stayed at 1.8V. Illustrated are continuous neural recording with electrical stimulation and the firing rate versus time. Two-channel data are plotted, one excitatory and one inhibitory.
Figure 21D:
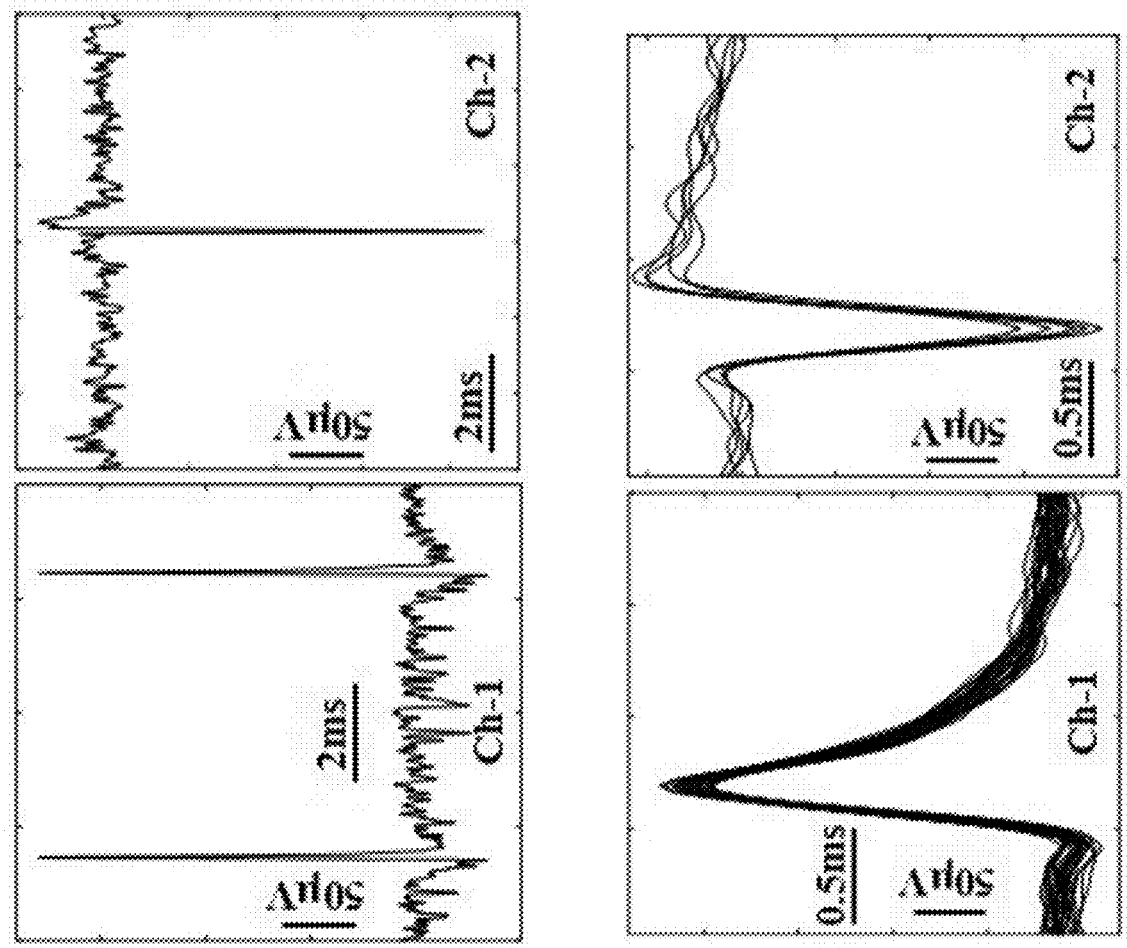
FIG. 21D provides sample spike clusters associated with the in vivo recording of FIG. 21C.

Referring now to FIGS. 19A and 19B, in other exemplary configurations, a SoC ("MIST-II") is particularly well-suited for large-scale recording and (optionally) stimulation. Each "MIST-II" SoC can have 1000 or more channels for recording, and 128 or more channels for stimulation. Data encoding and processing algorithms can be integrated so as to reduce the bandwidth to transmit data for 1000 or more channels. Each SoC can be connected to multiple high-density probes and can allow stimulation and recording from multiple cortical regions and depths. Various "MIST-II" configurations can be designed with a "one recorder—32 electrodes" topology that requires a mixed-signal process (+/−2.5V), supporting applications that do not require a high voltage. The "MIST-II" approach can be used to integrate high-density probes and allow recording and stimulation at an unprecedented scale, precision, and control.

Referring to FIGS. 20A and 20B results of in vivo testing of an exemplary version of the SoC 102 and of a prior system ("Blackrock") are illustrated, respectively. The experiment was performed in an unshielded environment, to demonstrate resistance to power line noise and interference from surrounding instruments. Recordings are filtered at 100 Hz-5 kHz. Resistance to ambient noise and interferences is very useful for clinical applications, as patients cannot always remain inside a faraday cage during treatments. As a comparison, the recordings from "Blackrock" are heavily corrupted by interference. As with those in FIG. 20A, recordings are filtered at 100 Hz-5 kHz.

Figure 23B:
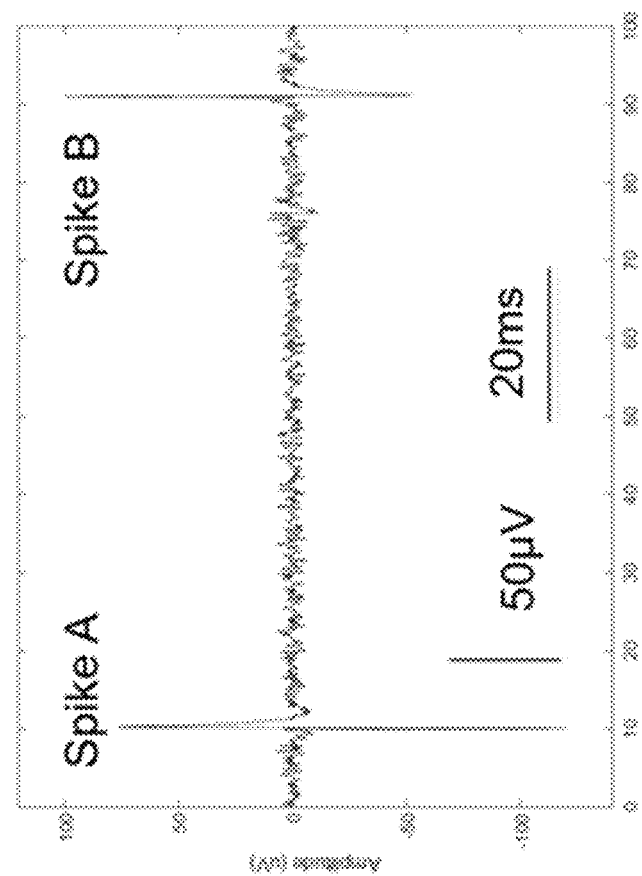
FIG. 23B provides an average of the 37 data segments of FIG. 23A, showing the spike templates. After stimulation is turned off, the firing rate drops and the synchronization can persist for a short period. Data are filtered at 100 Hz-5 kHz.
Figure 23A:
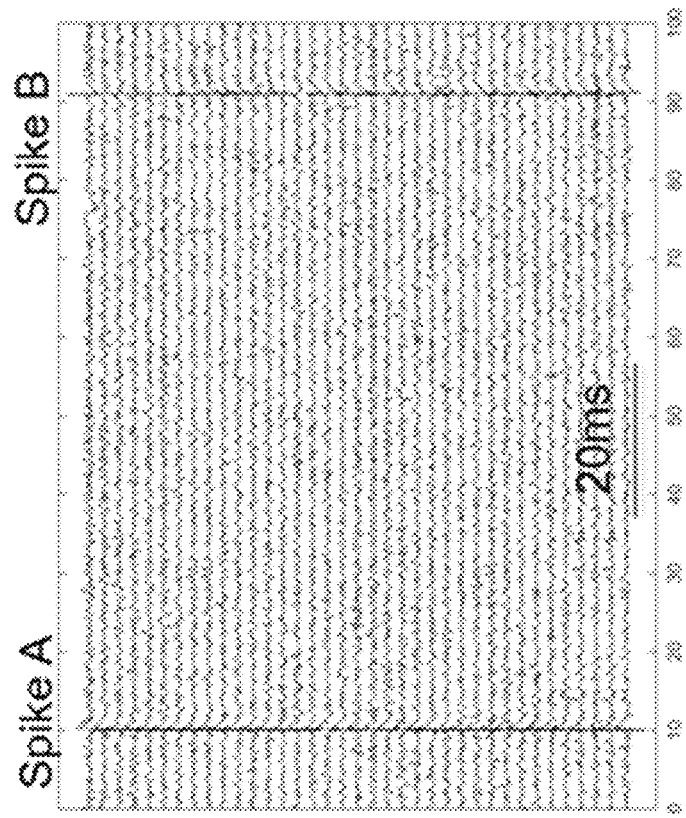
FIG. 23A is associated with in vivo testing of an exemplary SoC with prolonged repetitive electrical stimulation. Specifically, snapshots of neural activity under prolonged electrical stimulation from one channel is provided. Upon the detection of a "Spike A," a 100 ms segment is cropped from the data. Plotted are 37 data segments associated with 37 detected "Spike A," where there is a "Spike B" that follows the "Spike A" with a fixed interval.
Figure 24A:
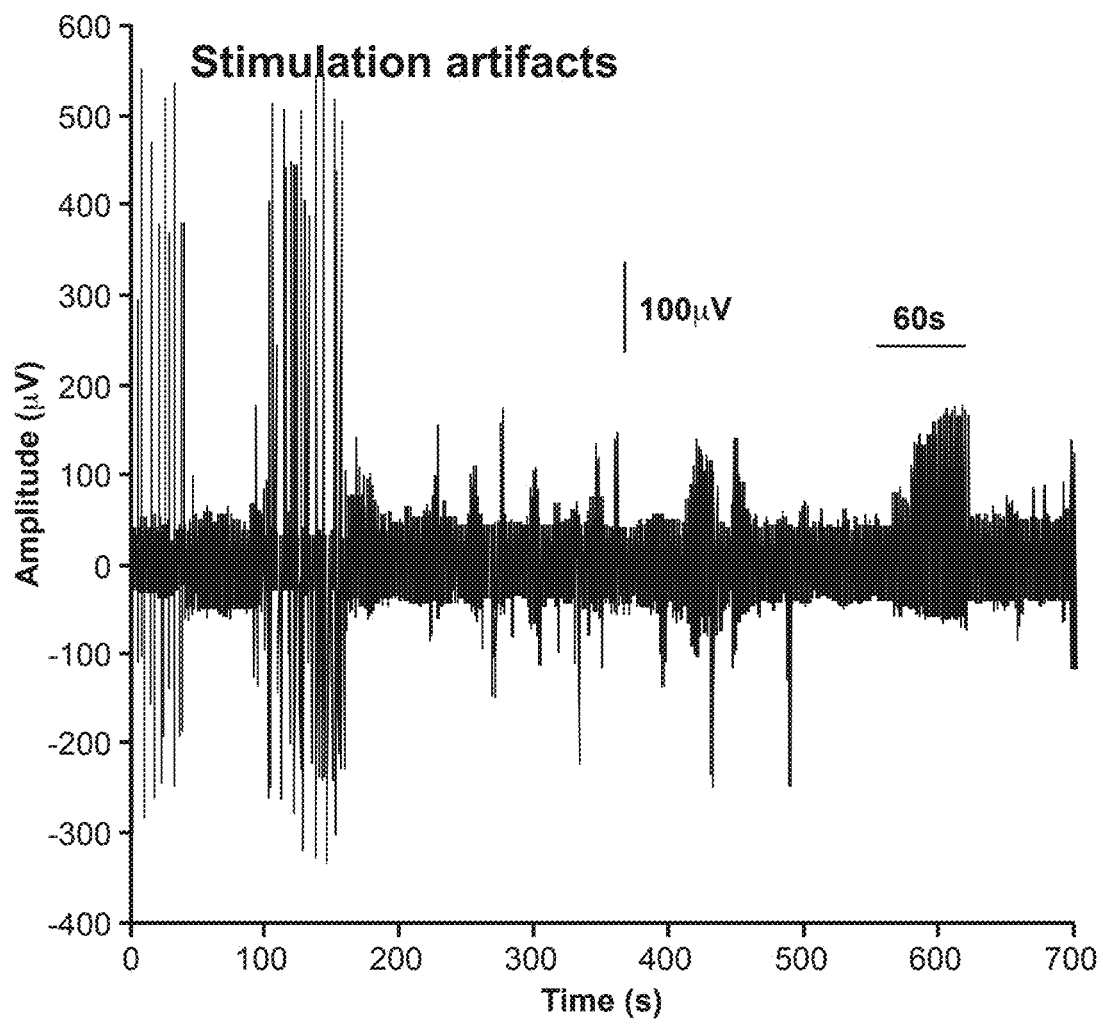
FIG. 24A illustrates that electrical stimulation can trigger neuronal oscillations in in vivo experiments. A 12-minute data window shows spike bursting after electrical stimulation.
Figure 24B:
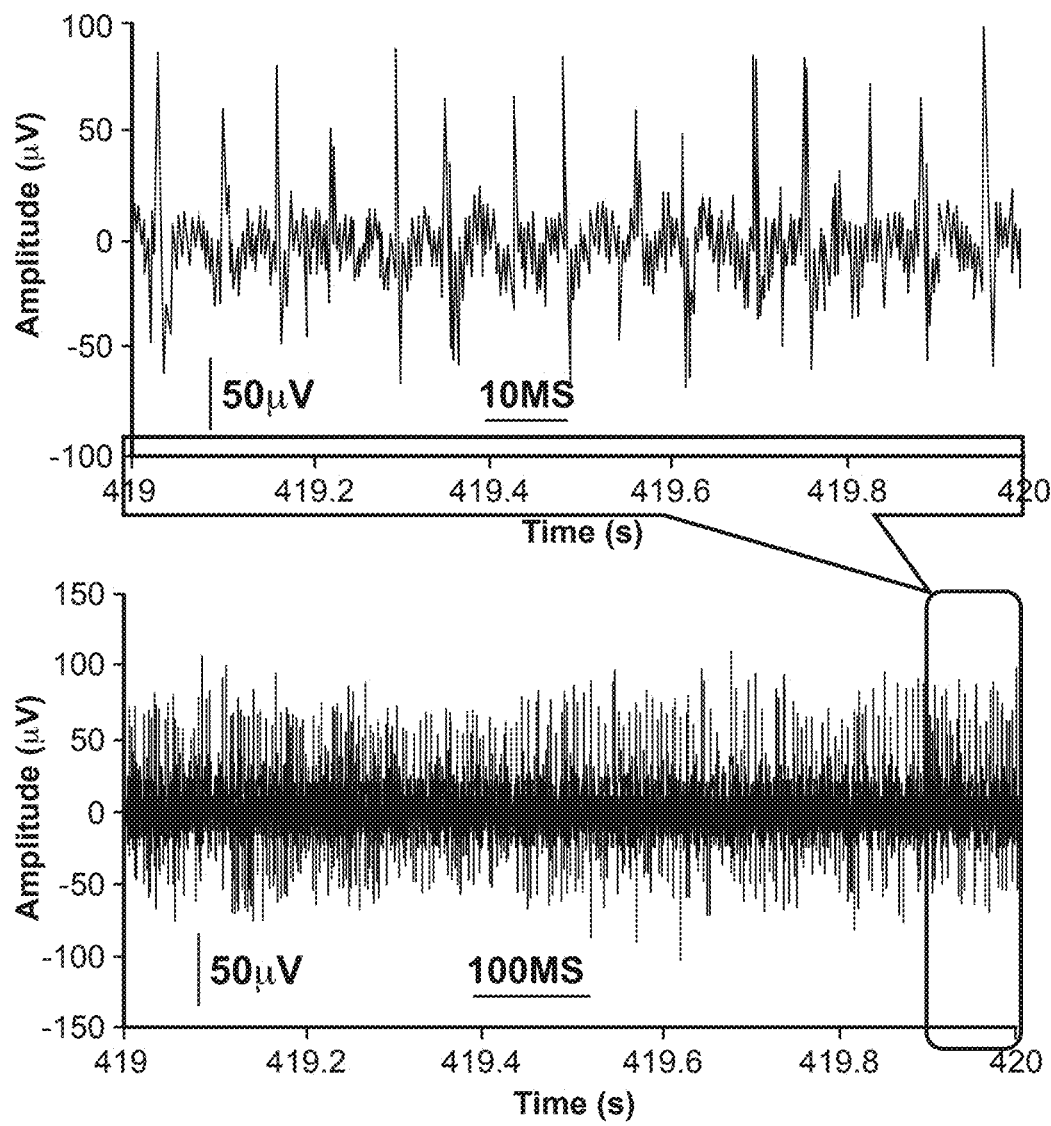
FIG. 24B provides an example spike bursting associated with the stimulation of FIG. 24A. Results suggest stimulation without recording can cause safety concerns in clinical use.
Figure 24C:
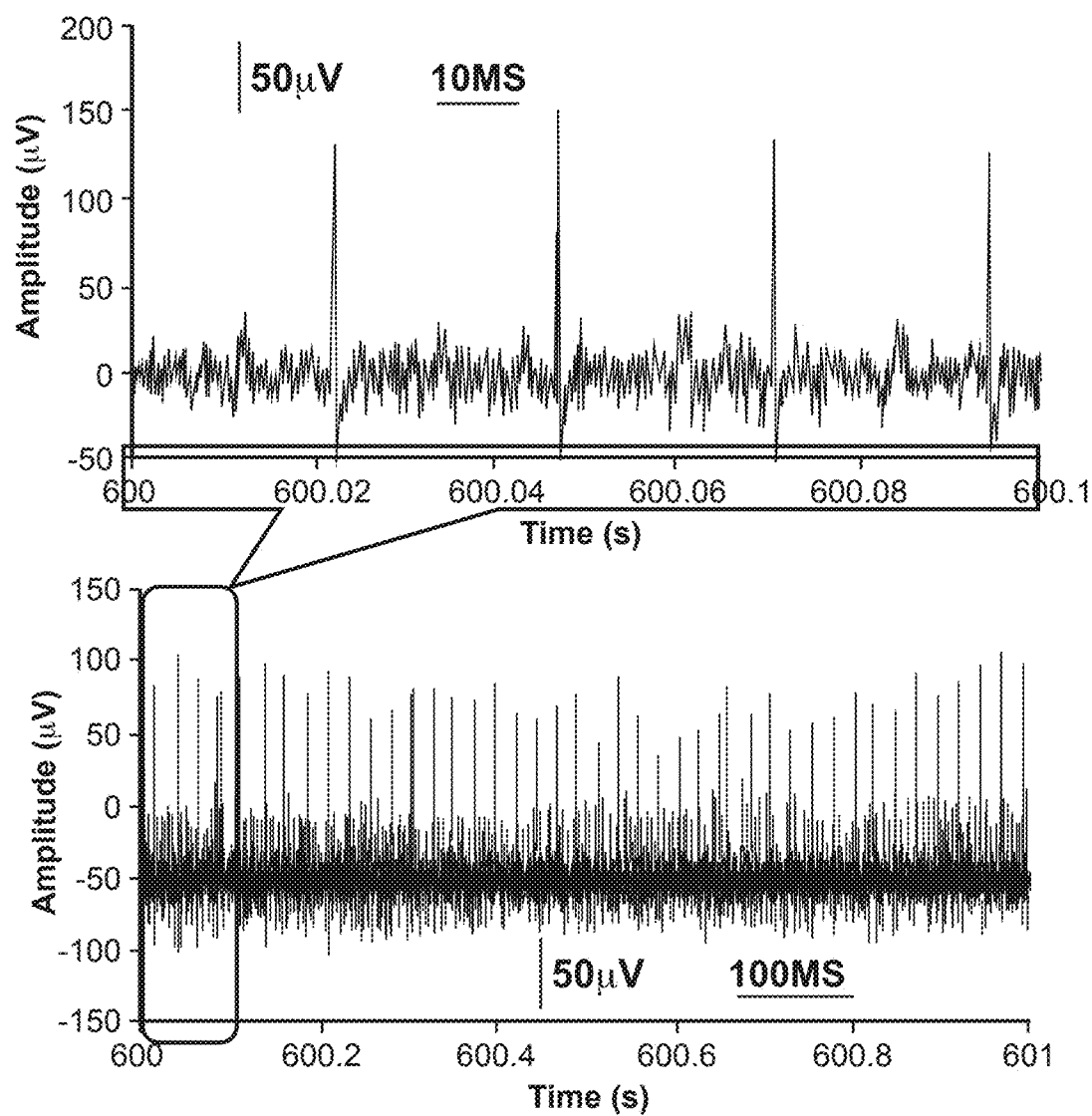
FIG. 24C provides another example spike bursting associated with the stimulation of FIG. 24A.

By way of comparison of signal quality, prior devices, such as the Blackrock, might have about a 10-bit effective precision with the goal of resolving a few hundred microvolt neural spikes, and with recording that is vulnerable to environmental interferences, artifacts, and unresolved noise. Also, signal quality of prior devices can degrade substantially in chronic experiments. Consequently, such devices are not suitable for applications that require the ability to record neural signals from nerves and axons, and their artifacts can be misinterpreted as signals. Another critical limitation of prior technologies is their lack of scalability. For example, when scaling to a higher recording density in prior architectures, device size and power will increase between linearly and quadratically with the channel count. System noise and interference also increase due to higher electrode impedance and more parasitic couplings. In addition, data encoding and compression algorithms are required on-chip to transfer data from a large number of channels. As a result, it is challenging to realize a high-channel-count headstage in prior systems. Table I provides a comparison of features of prior devices with those of certain "MIST" configurations that can remove stimulation artifacts up to (for example)+/−8V supply, and with certain "MIST-II" configurations that have (for example) one recorder that can (scalably) support 32 electrodes, and that can remove stimulation artifacts up to (for example)+/−2.5V supply.

activity. Exemplary versions of the system allow for the adjustment of stimulation parameters in a closed-loop system to control neuronal firings (see, e.g., FIGS. 21A to 21D). Because the impact of electrical microstimulation is not "one stimulus one response," monitoring neural activity under electrical stimulation allows for observations of activation of neurons, production of spike trains, modulation of firing rates (see, e.g., FIGS. 21C, 21D, 11, 13A and 13B), synchronize neurons (see, e.g., FIGS. 23A, 23B), and trigger or abolish brain oscillations (see, e.g., FIGS. 24A to 24C). The neural response can be sensitive to stimulation parameters, excited or inhibited, and variable.

For certain circuit implementations, a reduction in noise or improvement in circuit dynamic range may require extra power and area. For example, under the thermal slope, four times more power may be required for each extra bit of precision. Consequently, high-precision neurophysiological electronics are often bulky and power-hungry. Exemplary versions of the SoC are intended to precisely modulate and record neural activity while miniaturizing an electronics system with minimal or reduced power consumption. Exemplary versions have a circuit design that can achieve the

TABLE I

| | Exemplary Features of Certain "MIST" Configurations | Exemplary Features of Certain "MIST-II" Configurations | Features of Prior Devices for Comparison |
|---|---|---|---|
| Nominal supply voltage | +/−8 V | +/−2.5 V | 1.8 V-30 V |
| Power consumption | 0.005 mA | 0.005 mA | 0.05-1 mA |
| Noise in experiments | 4 μV | 4 μV | 25 μV |
| Maximum Input | May handle 8 V artifacts | May handle 2.5 V artifacts | 0.005 V |
| Size | <0.2 mm$^2$ | <0.02 mm$^2$ | 1 mm$^2$ |
| Scalability | 1,000 per cm$^2$ | 100,000 per 1 cm$^2$ | — |
| Electromagnetic shielding | Not required | Not required | Required |
| Simultaneous recording and stimulation | Yes | Yes | No |
| On-chip data encoding and compression | Yes | Yes | No |

Noise in neural recordings has been studied, and it has been found that 80-85% of the noise corresponds with biological activity, 10-15% with the electrode interface, and less than 3% with the electronics. Efforts to improve signal quality in exemplary versions of the SoC have been based in part on the hypothesis that biological activity can modulate the electrode interface noise, thus the noise associated with a microelectrode cannot be represented as a simple addition of biological noise, electrode noise, and circuit noise. Using this different approach toward improving signal quality, the electronic circuits of exemplary configurations can achieve about an order of magnitude or greater improvement in signal quality (see, e.g., FIGS. 14A-15D, 20A, and 20C-20E) and resistance to interferences as compared with previous approaches (see, e.g., FIG. 20B) while using the same electrodes. Exemplary versions could include an integrated chip for stimulation and low noise recording, with a high signal-to-noise ratio, that would provide the ability to record small neural signals (e.g., less than 10 microvolts), epineurally and intraneurally. This would have broad applicability in the peripheral nervous system, and would improve mapping of neural connectivity and end organ function.

Figure 22:
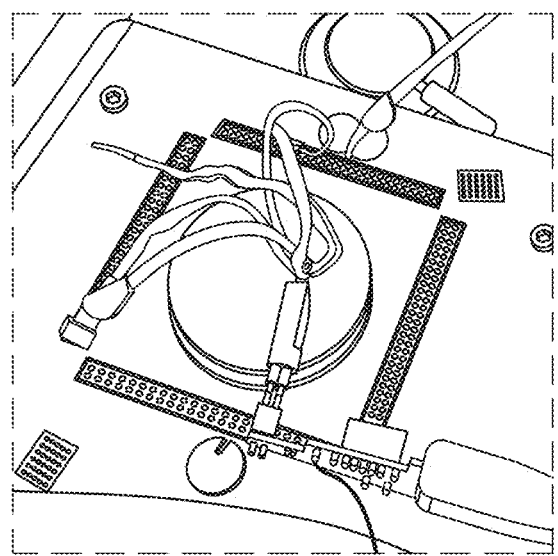
FIG. 22 provides an exemplary SoC, with setups for in vitro (above) and in vivo (bottom) experiments. Miniaturized circuits are effectively equivalent to an entire recording/stimulation system. A single digital cable may connect the electrodes with a computing device.
Figure 22:
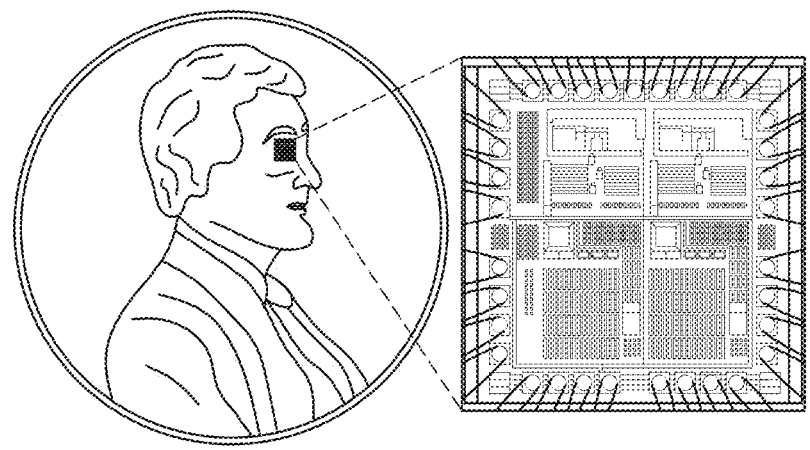
Figure 22:
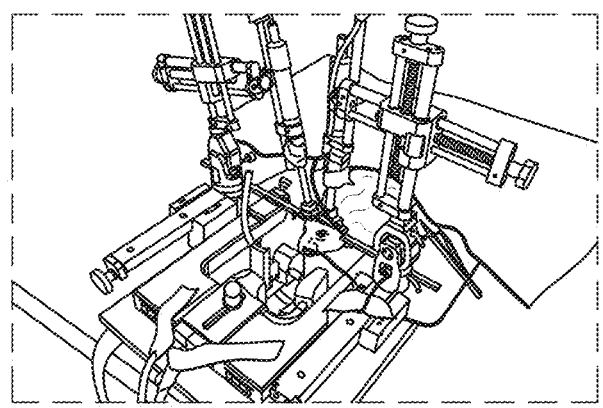

Although electrical stimulation has been used extensively for probing neural circuitry and identifying networks of neurons, the immediate effects of electrical stimulation on neural activity remain poorly understood, as their evaluation requires concurrent stimulation and monitoring of the neural needed high precision without increasing the circuits' power and area. In certain configurations, the SoC is small—about the size of Lincoln's eyes on a U.S. penny (FIG. 22)—and can include both recording and stimulation components. Simultaneous neural recording and stimulation was observed in both in vitro and in vivo experiments. For comparison, the prior 16-bit "Blackrock" system was saturated by the stimulation artifacts and was not able to record signals (compare FIGS. 17A and 17B).

As illustrated in FIG. 17A, the Blackrock recorder experiences circuit saturation when the stimulator is turned on and requires a few seconds to recover from the last stimulus, in which neural signals are lost. In contrast, FIG. 17B shows that the SoC 102 described herein can suppress the stimulation artifact while recording evolved neural spikes with a latency of only 5-8 milliseconds from the stimulus.

Circuitry in exemplary versions of the SoC may be "bio-inspired" for power reduction. For example, a redundant sampling and coding scheme, and its implementation in mixed-signal integrated circuits, may be used to improve precision. Such approaches are inspired by the retinal disparity phenomenon, in which two slightly different images produced in each eye are combined in the brain to create a single stream of information. An implicit hypothesis here is the brain's remarkable ability to pair neurons from two eyes provides more precise information. Similarly, exemplary versions may take an approach that utilizes multiple sets of markers and dynamically and intelligently blends imperfect markers to create extra precision. In exemplary analog to digital converters, for example, two extra bits of precision can be achieved. Such approaches help greatly reduce the circuitry's power and achieve an ultra-high precision that approaches the Shannon limit for neural sensing.

With traditional approaches, an increase in the number of channels associates with a reduction in circuit function and performance. For example, designs based on a single transistor, an inverter, and a three-transistor amplifier have been proposed for large-scale recording. These are essentially low-performance amplifiers that could not work well in experiments. Innovations in exemplary configurations (such as those of "MIST" and "MIST-II") have stemmed in part from a detailed investigation into making better use of transistors, where the superior bandwidth and switching speed are used to trade for multiple parallel circuit elements in neural recording and stimulation, thus engineering a new type of neural interface circuits. In certain "MIST-II" configurations, for example, one recorder can simultaneously serve multiple electrodes, where each channel has (for example) a 40 kHz sampling rate and the total sampling rate is 40×N kHz. Circuitry to remove or reduce noise, interference, and residual charge due to switching, without using large capacitors, is incorporated. To enhance form factor, the front-end, gain stage, and buffer with an adaptive biasing strategy can share the same operational amplifier. This can provide "MIST" configurations with a form factor that includes (for example) one single amplifier plus a large number of switches, controls, and small sampling capacitors to record from a large number of electrodes. (For example, one recorder can support 2 electrodes, 8 electrodes, etc.) In "MIST-II" configurations, one recorder may support (for example) 32 or more electrodes. As a result of an exemplary scaling method, the stimulator's size can be about half of the size as a recorder in the same process. Additional details are provided in the Appendix.

The above exemplary techniques allow recording and microstimulation at the same time without one impeding the other. The methodologies can support ultra-large-scale recording and precise neuromodulation. In various implementations, advanced features are achieved, such as 1) continuous, full-duplex simultaneous neural recording and stimulation; 2) fully-integrated scaling strategy where the size of the implantable electronics is not necessarily increased with the channel count, allowing ultra-large-scale recording and stimulation; and/or 3) a design that can suppress electrode noise and thus can support high impedance electrodes. This feature is important to ultra-large-scale recording, where each electrode tends to be small, with high impedance, and with more noise.

Exemplary systems and methods thus allow for continuous, simultaneous neural recording and electrical microstimulation. In vitro and in vivo experiments have been performed and carefully analyzed to validate these features. Bidirectional communication with brain circuits provides a better understanding of the impact of microelectrical stimulation. Various implementations are applicable to a wide spectrum of neurological diseases through closed-loop neuromodulation.

The present invention has been described in terms of one or more preferred versions, and it should be appreciated that many equivalents, alternatives, variations, additions, and modifications, aside from those expressly stated, and apart from combining the different features of the foregoing versions in varying ways, can be made and are within the scope of the invention. The true scope of the invention will be defined by the claims included in any later-filed utility patent application claiming priority from this provisional patent application.

We claim:

1. An implantable neuromodulation system comprising:
a microelectrode array including a stimulation microelectrode to deliver a desired electrical stimulation to a neuronal population and a recording microelectrode to receive neural signals from the neuronal population; and
a frequency-shaping amplifier (FSA) circuit including an FSA, the FSA circuit coupled to the microelectrode array, wherein the FSA circuit implements at least one of a multi-phase data sampling and processing technique, a modified parasitic capacitor suppression method, or a modified auto-zero (kT/C) noise cancellation scheme to improve signal-to-noise ratio of signals received by the FSA circuit;
wherein the FSA circuit comprises a feedback gain boosting path connected between an output terminal of the FSA and an inverting input terminal of the FSA, the feedback gain boosting path configured to reduce noise at low frequencies by transferring charge on a first capacitor of the FSA circuit to a second capacitor of the FSA circuit,
wherein the FSA circuit is configured to receive and electrically record neural signals received by the recording microelectrode of the microelectrode array from the neuronal population simultaneously with delivering electrical stimulation to the neuronal population using the stimulation microelectrode of the microelectrode array, and
wherein the stimulation microelectrode and the recording microelectrode are separated by between tens to hundreds of micrometers.

2. The system of claim 1, wherein the FSA circuit is configured to amplify, filter, and digitize the neural signals while suppressing stimulation artifacts.

3. The system of claim 1, wherein the microelectrode array is implemented on a single silicon chip in a high-voltage complementary metal-oxide-semiconductor (CMOS) process.

4. The system of claim 1, wherein the FSA circuit includes multi-phase data sampling and processing circuits that implement the multi-phase data sampling and processing technique, modified parasitic capacitor suppression method circuits that implement the modified parasitic capacitor suppression method, and modified auto-zero noise cancellation scheme circuits that implement the modified auto-zero (kT/C) noise cancellation scheme to improve the signal-to-noise ratio of signals output from the FSA circuit relative to signals received by the FSA circuit.

5. The system of claim 4, wherein the multi-phase data sampling and processing circuits are configured to boost a closed-loop gain of the implantable neuromodulation system without decreasing sampling frequency or input impedance.

6. The system of claim 4, wherein the modified parasitic capacitor suppression method circuits are configured to block charge transfer from amplifier input parasitic capacitors.

7. The system of claim 4, wherein the modified auto-zero noise cancellation scheme is configured to allow removal of noise appearing on a feedback capacitor from a switch-on resistor.

8. The system of claim 1, wherein the system is configured as a system-on-chip.

9. The system of claim 8, wherein the system-on-chip includes a recorder circuit block, a stimulation circuit block, and a digital circuit block that are physically isolated from each other, and that each operate on corresponding voltage rails having differing voltages.

10. The system of claim 8, wherein the system-on-chip is incorporated in an implantable medical device.

11. An implantable neuromodulation system comprising:
a microelectrode array including a stimulation microelectrode and a recording microelectrode, wherein a spacing between the stimulation microelectrode and the recording microelectrode is between tens to hundreds of micrometers, the stimulation microelectrode is configured to deliver a desired electrical stimulation to a neuronal population, and the recording microelectrode is configured to receive neural signals from the neuronal population; and
a frequency-shaping amplifier (FSA) circuit including an FSA, the FSA circuit coupled to the microelectrode array;
wherein the FSA circuit comprises a feedback gain boosting path connected between an output terminal of the FSA and an input terminal of the FSA, the feedback gain boosting path configured to transfer charge on a first capacitor of the FSA circuit to a second capacitor of the FSA circuit,
wherein the system is configured as a system-on-chip, and
wherein the FSA circuit is configured to perform electrical recording of the neural signals received by the recording microelectrode from the neuronal population during delivery of the desired electrical stimulation to the neuronal population by the stimulation microelectrode.

12. The system of claim 11, further comprising a recorder circuit block, a stimulation circuit block, and a digital circuit block that are physically isolated from each other, and that each operate on corresponding voltage rails having differing voltages.

13. The system of claim 11, further comprising a housing incorporating the system-on-chip to form an implantable medical device.

14. An implantable neuromodulation system comprising:
a microelectrode array including a stimulation microelectrode to deliver a desired electrical stimulation to a neuronal population and a recording microelectrode to receive neural signals from the neuronal population; and
a frequency-shaping amplifier (FSA) circuit including an FSA, the FSA circuit coupled to the microelectrode array to improve a signal-to-noise ratio of the neural signals received from the neuronal population via the recording microelectrode;
wherein the FSA circuit comprises a feedback gain boosting path connected between an output terminal of the FSA and an input terminal of the FSA, the feedback gain boosting path configured to transfer charge on a first capacitor of the FSA circuit to a second capacitor of the FSA circuit,
wherein the FSA circuit is configured to receive and electrically record neural signals received by the recording microelectrode of the microelectrode array from the neuronal population simultaneously with delivering electrical stimulation to the neuronal population using the stimulation microelectrode of the microelectrode array, and
wherein the stimulation microelectrode and the recording microelectrode are separated by between tens to hundreds of micrometers in the microelectrode array.

15. The system of claim 14, wherein the input terminal of the FSA comprises an inverting input terminal of the FSA.

16. The system of claim 15, wherein:
the feedback gain boosting path is configured to transfer the charge on the first capacitor to the second capacitor during a second time period that occurs after a first time period; and
the feedback gain boosting path is not configured to transfer the charge on the first capacitor to the second capacitor during the first time period.

17. The system of claim 16, wherein the feedback gain boosting path is configured to transfer the charge on the first capacitor to the second capacitor in accordance with a ratio of a capacitance of the first capacitor to a capacitance of the second capacitor.

* * * * *